(12) United States Patent
Parker

(10) Patent No.: US 12,417,190 B2
(45) Date of Patent: Sep. 16, 2025

(54) DATA INTEGRITY CHECK FOR GRANULE PROTECTION DATA

(71) Applicant: Arm Limited, Cambridge (GB)

(72) Inventor: Jason Parker, Sheffield (GB)

(73) Assignee: Arm Limited, Cambridge (GB)

( * ) Notice: Subject to any disclaimer, the term of this patent is extended or adjusted under 35 U.S.C. 154(b) by 368 days.

(21) Appl. No.: 17/995,898

(22) PCT Filed: Apr. 9, 2021

(86) PCT No.: PCT/GB2021/050872
§ 371 (c)(1),
(2) Date: Oct. 10, 2022

(87) PCT Pub. No.: WO2021/209744
PCT Pub. Date: Oct. 21, 2021

(65) Prior Publication Data
US 2023/0185733 A1 Jun. 15, 2023

(30) Foreign Application Priority Data
Apr. 14, 2020 (GB) ..................... 2005430

(51) Int. Cl.
*G06F 12/109* (2016.01)
*G06F 12/14* (2006.01)

(52) U.S. Cl.
CPC ...... *G06F 12/1441* (2013.01); *G06F 12/1408* (2013.01); *G06F 12/1483* (2013.01)

(58) Field of Classification Search
CPC ............. G06F 12/1441; G06F 12/1408; G06F 12/1483
See application file for complete search history.

(56) References Cited

U.S. PATENT DOCUMENTS

| 6,859,867 | B1 | 2/2005 | Berry |
| 7,287,140 | B1 | 10/2007 | Asanovic et al. |
| 8,443,136 | B2 * | 5/2013 | Frost ....................... G06F 12/14 365/185.11 |

(Continued)

FOREIGN PATENT DOCUMENTS

| GB | 2421821 A | * | 7/2006 | ......... G06F 12/1036 |
| GB | 2575877 A | | 1/2020 | |

(Continued)

OTHER PUBLICATIONS

Robert Bedichek, "Some Efficient Architecture Simulation Techniques", Department of Computer Science, FR-35 University of Washington, Seattle, Washington 98195, 1990.

(Continued)

*Primary Examiner* — Tarek Chbouki
(74) *Attorney, Agent, or Firm* — NIXON & VANDERHYE P.C.

(57) ABSTRACT

Address translation circuitry translates a target virtual address (VA) specified by a memory access request into a target physical address (PA) associated with a selected physical address space (PAS) selected from among a plurality of PASs. A granule protection data block is loaded from memory comprising at least one granule protection entry (GPE), each GPE corresponding to a respective granule of PAs and specifying granule protection information (GPI) indicating which of the PASs is an allowed PAS. Filtering circuitry determines whether the memory access request should be allowed to access the target PA, based on whether the selected PAS is indicated as an allowed PAS by the GPI in a target granule protection entry (GPE). Integrity checking circuitry performs a data integrity check on the granule protection data block loaded from memory, and signals a fault when the data integrity check fails.

16 Claims, 12 Drawing Sheets

(56) References Cited

U.S. PATENT DOCUMENTS

| | | | |
|---|---|---|---|
| 2008/0235485 A1* | 9/2008 | Haertel | G06F 11/1044 |
| | | | 714/E11.041 |
| 2009/0320048 A1 | 12/2009 | Watt et al. | |
| 2014/0189274 A1 | 7/2014 | Hildesheim et al. | |
| 2015/0046771 A1* | 2/2015 | Kim | H03M 13/3738 |
| | | | 714/764 |
| 2015/0089234 A1* | 3/2015 | Kaluzhny | G06F 21/85 |
| | | | 713/176 |
| 2016/0070507 A1* | 3/2016 | Hoshikawa | G06F 12/0246 |
| | | | 711/149 |
| 2017/0220441 A1* | 8/2017 | Zhang | G06F 11/1092 |
| 2018/0181328 A1* | 6/2018 | Espeseth | G06F 9/5083 |
| 2019/0196977 A1 | 6/2019 | Cong et al. | |
| 2019/0236022 A1 | 8/2019 | Gopal et al. | |
| 2019/0286571 A1* | 9/2019 | Mori | G06F 12/0246 |
| 2020/0019515 A1 | 1/2020 | Koufaty et al. | |
| 2020/0050783 A1 | 2/2020 | Yamada et al. | |

FOREIGN PATENT DOCUMENTS

| | | |
|---|---|---|
| JP | 2003-242030 | 8/2003 |
| TW | 201941064 | 10/2019 |
| WO | 2018/158909 | 9/2018 |
| WO | 2019/002810 | 1/2019 |

OTHER PUBLICATIONS

"TrustZone® Address Space Controller (TZC-380)", Technical Reference Manual, 2008, 2010 ARM Limited.

"ARM Security Technology Building a Secure System using TrustZone® Technology", 2005-2009 ARM Limited.

Office Action for JP Application No. 2022-559849 issued Jan. 21, 2025 and English translation, 8 pages.

Office Action for IN Application No. 202217058887 dated Jun. 19, 2025, 6 pages.

\* cited by examiner

DATA INTEGRITY CHECK FOR GRANULE PROTECTION DATA

The present technique relates to the field of data processing.

A data processing system may have address translation circuitry to translate a virtual address of memory access request to a physical address corresponding to a location to be accessed in a memory system.

At least some examples provide an apparatus comprising: address translation circuitry to translate a target virtual address specified by a memory access request into a target physical address associated with a selected physical address space selected from among a plurality of physical address spaces; granule protection entry loading circuitry to load from memory a granule protection data block comprising at least one granule protection entry, each granule protection entry corresponding to a respective granule of physical addresses and specifying granule protection information indicative of which of the plurality of physical address spaces is an allowed physical address space from which the granule of physical addresses is allowed to be accessed; filtering circuitry to determine whether the memory access request should be allowed to access the target physical address, based on whether the selected physical address space is indicated as an allowed physical address space by the granule protection information in a target granule protection entry corresponding to a target granule of physical addresses including the target physical address; and integrity checking circuitry to perform a data integrity check on the granule protection data block loaded from memory, and to signal a fault when the data integrity check fails.

At least some examples provide a data processing method comprising: translating a target virtual address specified by a memory access request into a target physical address associated with a selected physical address space selected from among a plurality of physical address spaces; loading from memory a granule protection data block comprising at least one granule protection entry, each granule protection entry corresponding to a respective granule of physical addresses and specifying granule protection information indicative of which of the plurality of physical address spaces is an allowed physical address space from which the granule of physical addresses is allowed to be accessed; performing a data integrity check on the granule protection data block loaded from memory, and signalling a fault when the data integrity check fails; and determining whether the memory access request should be allowed to access the target physical address, based on whether the selected physical address space is indicated as an allowed physical address space by the granule protection information in a target granule protection entry corresponding to a target granule of physical addresses including the target physical address.

At least some examples provide a computer program comprising instructions which, when executed on a host data processing apparatus, control the host data processing apparatus to provide an instruction execution environment for execution of target code; the computer program comprising: address translation program logic to translate a target virtual address specified by a memory access request into a target simulated physical address associated with a selected simulated physical address space selected from among a plurality of simulated physical address spaces; and granule protection entry loading program logic to load from memory a granule protection data block comprising at least one granule protection entry, each granule protection entry corresponding to a respective granule of simulated physical addresses and specifying granule protection information indicative of which of the plurality of simulated physical address spaces is an allowed simulated physical address space from which the granule of simulated physical addresses is allowed to be accessed; filtering program logic to determine whether the memory access request should be allowed to access the target simulated physical address, based on whether the selected simulated physical address space is indicated as an allowed simulated physical address space by the granule protection information in a target granule protection entry corresponding to a target granule of simulated physical addresses including the target simulated physical address; and integrity checking circuitry to perform a data integrity check on the granule protection data block loaded from memory, and to signal a fault when the data integrity check fails.

At least some examples provide a computer-readable storage medium storing the computer program described above. The computer-readable storage medium may be a non-transitory storage medium or a transitory storage medium.

BRIEF DESCRIPTION OF THE DRAWINGS

Further aspects, features and advantages of the present technique will be apparent from the following description of examples, which is to be read in conjunction with the accompanying drawings, in which.

DETAILED DESCRIPTION

Figure 1:
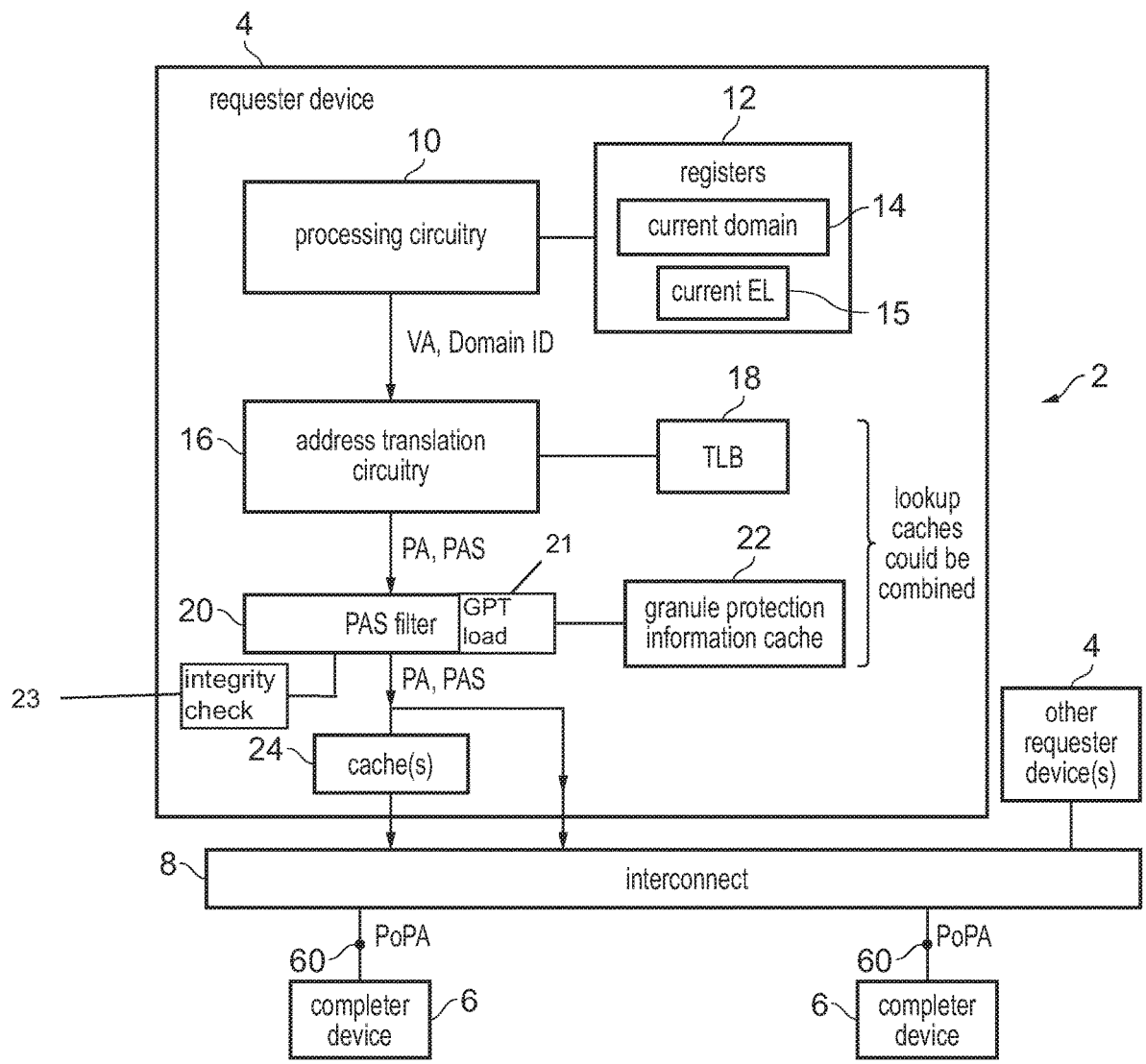
FIG. 1 illustrates an example of a data processing apparatus.

Data processing systems may support use of virtual memory, where address translation circuitry is provided to translate a virtual address specified by a memory access request into a physical address associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support operation in a number of domains and a number of distinct physical address spaces may be supported, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

In a system in which a virtual address of a memory access request can be mapped to a physical address in one of two or more distinct physical address spaces, granule protection information can be used to limit which physical addresses are accessible within a particular physical address space. This can be useful for ensuring that certain physical memory locations implemented in hardware either on-chip or off-chip can be restricted for access within a particular physical address space or a particular subset of physical address spaces if desired.

The granule protection information can be loaded from a table structure stored in memory, where the table structure provides a number of granule protection entries, each granule protection entry corresponding to a respective granule of physical addresses. The granule protection information specifies, for the corresponding granule of physical addresses, which of the physical address spaces is an allowed physical address space from which the corresponding granule of physical addresses is allowed to be accessed. It is possible for the granule protection entry for a given granule to specify that none of the physical address spaces are allowed physical address spaces, that a single one of the physical address spaces is an allowed physical address space, or that two or more of the physical address spaces are allowed physical address spaces. Filtering circuitry may use the granule protection information from a target granule protection entry corresponding to a target physical address to be accessed, to check whether the memory access request is allowed to proceed. This lookup may be a further stage of lookup performed in addition to the checks of any access permissions performed by the address translation circuitry based on page table structures.

As the granule protection information controls which physical address spaces are able to access a given set of physical addresses, corruption or tampering with the granule protection information could lead to complete loss of the security guarantee provided by the isolation of the respective physical address spaces (e.g. if the granule protection information was corrupted to indicate that a physical address which should be reserved for access from one physical address space should instead be accessible from another physical address space, this could lead to leakage of sensitive information). In typical systems involving isolation of multiple physical address spaces, the information controlling the partitioning between the physical address spaces has been stored in hardware storage which is relatively secure against tampering by an unauthorised attacker. For example, the partitioning data could be stored in a set of on-chip registers which are not exposed to external access. As in such systems the physical storage for the partitioning information can be designed to provide sufficient guarantees of security, it is surprising that there would be a need for data integrity checking for such information.

However, the inventor recognised that recently there is increasing demand for having a relatively large number of different software processes operating on the same system that may each wish to be provided with a secure 'sandbox' isolated from access by other processes. The relationships between such software processes are becoming more complex and so for such a model it may not be feasible to define the access rights using registers or other on-chip storage alone. To provide more fine-grained control over access rights, a more complex table defining granule protection information at granularity of individual granules of physical address space may be desired, defining information per granule of physical addresses. The granules of physical address space (for which respective items of granule protection information are defined) may be of a particular size, which may be the same as, or different to, the size of the pages used for a page table structure used for the address translation circuitry. In some cases the granules may be of a larger size than the pages defining address translation mappings for the address translation circuitry. Alternatively, the granule protection information may be defined at the same page-level granularity as address translation information within a page table structure. Defining granule protection information at page-level granularity can be convenient as this may then allow more fine-grained control over which regions of memory storage hardware are accessible from particular physical address spaces and hence from particular domains of operations of processing circuitry. However, other sized granules could also be used.

With such a model, where there may be a greater number of physical address spaces, greater number of different access permission types, and/or greater number of distinct regions of physical addresses for which different access rights are to be defined, it may no longer be practical to define the granule protection information in a region of hardware storage that is invulnerable to attack, as the hardware circuit area/power costs may be too high. Therefore, the granule protection information may instead be stored in regular memory, which may expose some granule protection information to outside access so that it is possible that the granule protection information could be modified (either deliberately by an attacker, or unintentionally), which could risk loss of security for the processes relying on the granule protection information.

With the approach described below, the apparatus has integrity checking circuitry for performing a data integrity check on a granule protection data block loaded from memory by granule protection entry loading circuitry. If the data integrity check passes, the granule protection data block can be used for filtering of memory access requests by the filtering circuitry. If the data integrity check fails, the integrity checking circuitry signals a fault. This allows detection of possible tampering or corruption of the granule protection information while it is stored in a vulnerable part of memory, enabling more complex forms of granule protection information to be used whose size makes it infeasible to store all of it in hardware-protected-storage which is invulnerable to attack. Hence, security can be improved and the flexibility of use cases supported using the granule protection information increased.

The timing of the data integrity check can vary. In some cases, a granule protection data block may be loaded for each memory access, in which case each non-GPT-related memory access (e.g. a regular memory access issued by processing circuitry, or a page table walk memory access generated by the address translation circuitry) may cause a data integrity check to be performed on the corresponding granule protection data used to check whether a target address of the non-GPT-related memory access is allowed to be accessed. However, performance can be faster if the filtering circuitry has access to a granule protection data cache for caching granule protection data (this cache could be a standalone cache dedicated for caching of granule protection data, or could be shared with caching of address translation data). In this case, memory access requests which hit in the granule protection data cache do not need to load granule protection data from memory, so do not need the data integrity check (the cache may be assumed to be robust against errors and so does not need additional integrity checks), but requests which miss in the cache may have the data integrity check performed when the requested granule protection data is returned from memory.

Data integrity protection techniques are known for protecting regular data stored to vulnerable memory (such as off-chip memory for example), but have a problem that they incur a relatively large cost in terms of processing performance, power consumption and storage capacity. While encryption of data stored to a vulnerable region of memory may be sufficient to ensure confidentiality, it does not in itself protect against the possibility of data being corrupted (intentionally or unintentionally) while it is stored in the vulnerable region of memory, so that when the data is read back it has a different value to the value stored. In systems which require protection against tampering, integrity metadata (e.g. a hash or authentication code) can be derived from stored data at the time it is written, which can then be compared with corresponding metadata re-calculated from the stored data at the time the data is read, to determine whether the data has changed. However, maintaining such metadata for a protected address region of a reasonable size can require a relatively large metadata structure, which may be too large to store in hardware-protected memory, and so some of that metadata may itself need to be stored in memory vulnerable to tampering, so that further integrity metadata has to be derived from it and stored for later checking the metadata against tampering. That further integrity metadata may itself require protection, and so on, so that a tree structure may be maintained to track the respective levels of metadata, eventually allowing all the metadata (and the underlying protected data) to be verified using a root of trust which is sufficiently small to store in hardware-protected memory which is not vulnerable to tampering. Maintaining this metadata (e.g. a Merkle tree) can be expensive to maintain, both in terms of increasing the storage capacity needed, and in incurring a performance cost because each read/write of actual data to the memory region to be protected by the metadata tree requires several other reads/writes merely for maintaining or checking a number of pieces of integrity metadata in the tree. In some implementations, there is only a relatively small portion of the address space which requires integrity protection, so that the performance cost of such integrity protection techniques is justified, as it will not be needed for the majority of memory accesses accessing addresses outside the integrity protected region.

However, if data integrity checking was applied to the granule protection information used for filtering whether memory accesses are allowed based on whether the selected physical address space is an allowed physical address space, this may mean that a much larger number of memory accesses could be delayed due to performing data integrity checks (if its granule protection data is not already available and so has to be loaded from memory), as the need for data integrity checking would no longer be restricted to the accesses which read/write data in a relatively small portion of the physical address space (even if the granule protection data itself is saved to a relatively small integrity-protected portion of physical address space, accesses to that granule protection data may be caused by an access to any part of the physical address space). Hence, this is another reason why it would be counter-intuitive to a skilled person that it would be desirable to store granule protection data in a region of memory which is vulnerable to corruption/tampering, or that it would be desirable to require data integrity checks on granule protection data blocks loaded from memory before they are used to filter the memory access requests—one would think that the implementation cost of integrity protection would be too high for data which could potentially be needed on every memory access.

However, the inventor recognised a number of points associated with the granule protection data, that can be used to enable a much more lightweight form of integrity checking to be used for checking the granule protection data compared to conventional integrity checking techniques.

The granule protection information for a given granule may be smaller in size than the size of a block of data requested from memory in a given transaction, so when a target granule protection entry is needed to be loaded to service a particular memory access request, the granule protection entry loading circuitry may actually load a granule protection data block comprising multiple granule protection entries, each of those granule protection entries corresponding to a different granule of physical addresses. Even if the other granule protection entries are not currently needed, they may be needed for handling other memory access requests soon, so it can be useful to cache those other granule protection entries. As the integrity checking circuitry has an entire block of multiple granule protection entries available, it can perform the data integrity check on the block of granule protection entries as a whole.

Also, in cases where the granule protection information is stored in a region of memory which would be vulnerable to access by an attacker, memory encryption circuitry may be provided. A protected region of memory may be defined which corresponds to the region of memory which would be vulnerable if it was not protected by the encryption and is designated for storing secure data to be protected against attack (not all data is sensitive so the protected region does not necessarily need to span the entire address range of the vulnerable memory storage). When data is written to the protected region of memory, the memory encryption circuitry encrypts the data specified in the write access request, and provides the encrypted data to be stored to the protected region of memory. When data is read from the protected region of memory, the memory encryption circuitry decrypts the encrypted data read from the protected region and provides the decrypted data as a response to the corresponding read access request. Hence, if the granule protection data is stored to the protected region protected by encryption using the memory encryption circuitry, when the granule protection entry loading circuitry loads a granule protection data block from the protected region of memory, the memory encryption circuitry may decrypt the granule protection data block read from the protected region of memory prior to providing the granule protection data block to the filtering circuitry or the integrity checking circuitry.

Hence, in systems which expose the granule protection information to a memory region which could be vulnerable to tampering or corruption (e.g. off-chip memory), memory encryption may be used for the granule protection information when it is stored in that vulnerable memory region. Encryption/decryption functions used to map between plaintext and ciphertext may be more secure if they are designed to have the property of "diffusion", where changing one bit in one of the plaintext/ciphertext causes the other to change by a much larger number of bits.

The memory encryption circuitry may perform encryption/decryption according to a certain cryptographic primitive which operates on blocks of data of a given size. The size of the block of data operated on by the cryptographic primitive may be larger than the size of one granule protection entry, so that a granule protection data block of multiple granule protection entries may be encrypted as a common block of data by the memory encryption circuitry.

Hence, when a granule protection data block is stored to the protected memory region subject to encryption, there is a correlation between integrity of one granule protection entry in the granule protection data block and integrity of another granule protection entry in the same granule protection data block. This is because even if only a single bit is changed in the ciphertext while it is stored in memory, this has potentially to corrupt more than one granule protection entry in the block. Hence, when a target granule protection entry is loaded because it is not already accessible to the filtering circuitry, and the data integrity check fails for one of the plurality of granule protection entries of the granule protection data block other than the target granule protection entry, the integrity checking circuitry may signal the fault even if the data integrity check passes for the target granule protection entry.

Hence, by performing the checks on a block of multiple entries, and signalling the fault if any one of the granule protection entries in the block fails the integrity check (even if the target granule protection entry currently required for filtering a current memory access request itself passed the check) this can allow a more lightweight data integrity check to be used (which has a lower probability of detecting tampering in an individual granule protection entry), because the probability that the data integrity check fails to detect corruption (false negative) in any of the granule protection entries within the block can be extremely low even if the probability of false negative for an individual granule protection entry is relatively high.

For example, the granule protection information may be encoded using a certain number of bits (e.g. N bits) of the granule protection entry. Not all of the $2^N$ possible encodings of those N bits may be needed to indicate valid options for the granule protection information. For example, the number of valid options needed may not be an exact power of 2, so there may be some spare encodings left. Also, the designers of an instruction set architecture may choose to leave some encodings spare to provide room for future architecture expansion in case further options need to be added later.

Hence, the granule protection information may be encoded using N bits which have a number of encodings. A first subset of encodings of the N bits are valid encodings indicating valid options for the granule protection information. A second subset of the encodings of the N bits are invalid encodings, which do not indicate any valid options for the granule protection information. In one example, the data integrity check may comprise checking, for each granule protection entry in the granule protection data block, whether that granule protection entry has one of the first subset of encodings or the second subset of encodings. If any one of the granule protection entries in the granule protection data block has one of the second subset of encodings, the fault is signalled (even if the granule protection entry that has the invalid encoding is not the target granule protection entry which is needed for filtering of a current memory access request).

It may seem surprising that simply checking whether the encoding of the granule protection information is a valid encoding would be sufficient to act as a data integrity check. One would think that this check would not be sufficient because it could not detect tampering which changes the granule protection information from one valid encoding to a different valid encoding.

However, as mentioned above, due to the use of encryption, if any one granule protection entry in a loaded block has an invalid encoding, this may signal a risk that all the other granule protection entries in the same cryptographic primitive block could also have changed, due to the diffusive property of cryptographic functions. Hence, for an attacker to be able to tamper with the stored encrypted block of granule protection entries in such a way that the data integrity check would not detect the tampering, this would require the modification of the ciphertext version of the stored data to be such that each of the granule protection entries happens to be modified to one of the first subset of valid encodings, and none of the granule protection entries is modified to one of the second subset of invalid encodings.

In many cases, the combination of the number of granule protection entries in the data block and the number of encodings in the second subset of encodings can be sufficient that the probability of the tampering causing all of the granule protection entries to have one of the second subset of invalid encodings may be acceptably small. If this is not already the case, the architectural designer could ensure that this is achieved by either (i) increasing the number of granule protection entries in the data block, or (ii) providing one or more additional bits of redundant granule protection information to increase the number of invalid encodings in the second subset. Hence, another possible reason for having invalid encodings of the granule protection information may simply be to increase the protection against tampering. While the second option of adding redundant granule protection information bits that are not needed to encode valid information may appear wasteful, this may still require fewer additional bits than would be needed for storing an authentication code or other piece of metadata for comparing against the stored data, and avoids the performance overhead of a multiplicity of additional read/writes for integrity metadata maintenance as described above.

Hence, with this approach the data integrity check may be a simple check of whether the encoding is valid, which does not require any additional reads/writes of stored metadata, or any authentication code calculations for deriving authentication codes from the stored data. The data integrity check may be implemented with a relatively simple (low power and low latency) set of logic gates for checking whether the encoding of each granule protection entry is one of the first subset of valid encodings. This greatly reduces the performance and circuit area cost of implementing integrity checking. If this approach to data integrity checking is used, the software that manages the granule protection entries may ensure that when setting a granule protection entry for a granule of interest, the other granule protection entries in the same granule protection data block are set to valid encodings (even if the granules of addresses corresponding to those granule protection entries are not currently in use).

It will be appreciated that, from an architectural point of view, the selection of which memory region should store the granule protection information is made by a system designer implementing a specific processing system, so is not an architectural feature defined by an instruction set architecture used to define the interaction between program code and processing hardware. Hence, it is not essential in any given processor system implementing the instruction set architecture that the granule protection data is stored in any particular location or that memory encryption circuitry is provided. Hardware system designers (or a party operating a hardware system, such as a server operator) may choose, for a particular implementation, whether they prefer to store the granule protection information in a region of on-chip memory which is protected from tampering by its hardware design (so does not need encryption), or in a region of memory which is potentially vulnerable to attack because it is outside a boundary of trust (e.g. off chip memory on a different integrated circuit so that the memory interface between the integrated circuits could be probed by an attacker), for which memory encryption may be used.

Either way, the architectural definition of the granule protection entry loading circuitry, filtering circuitry and integrity checking circuitry may be such that this circuitry performs the data integrity check (by verifying that the encoding is valid as described above) when a granule protection block is loaded from memory, prior to the granule protection information being used for filtering of memory accesses. If the system designer has chosen to implement the granule protection information in hardware-protected memory which is not vulnerable to tampering, then that data integrity check may have been redundant, but it is in any case relatively lightweight so this does not have a significant performance impact. However, if the system designer did choose to store the granule protection information in a memory vulnerable to tampering, then it may be expected that the system designer would also provide memory encryption circuitry, and so in this case the data integrity check to check for valid encodings of the granule protection information can help protect against the risk of the attacker changing the encrypted granule protection information while it is stored in the vulnerable memory.

Although the data integrity check which checks for valid encodings of granule protection information is particularly lightweight and effective, in other examples it may be preferred to implement a data integrity check which comprises determining whether at least one integrity signature value associated with the granule protection data block matches at least one signature checking value derived from the granule protection data block. For systems which only require a relatively small physical address space to be protected using the granule protection data, current integrity protection techniques may be feasible, and could provide a stronger probability of detecting tampering than the check of valid encodings described above. Also, although currently expensive in terms of performance for protecting larger physical address spaces, it is expected that in future this may become more feasible, as integrity protection techniques themselves become more developed, it becomes feasible to provide larger capacity of storage for integrity metadata in hardware-protected memory, and as access to memory becomes faster. Therefore, in other implementations it is possible for the data integrity check to be based on integrity signature values stored in association with the granule protection data blocks, which can be checked on reading the granule protection data block to see whether they match a signature checking value, which comprises a newly computed signature derived from the read granule protection data block using the same signature calculation function that was used to derive the integrity signature value at the time of writing the granule protection data block. For example, the signature could be a hash or message authentication code computed from the granule protection data block based on a secret key and optionally a freshness value such as a counter or other value which changes each time the block is written (this can protect against replay attacks based on substituting the latest values of the granule protection data block and the signature with older values which were once correct but are no longer correct).

In response to the memory access request, when no valid granule protection entry has been defined for the target granule of physical addresses, or when the filtering circuitry determines based on the target granule protection entry that the memory access request is not allowed to access the target physical address, the filtering circuitry may signal a fault associated with a different fault type or different fault syndrome information to the fault signaled by the integrity checking circuitry when the data integrity check fails. Hence, whether through a different fault type (e.g. different fault identifier) or by recording information within a syndrome register to indicate the cause of the fault, the exception handler dealing with the fault may be able to identify from the fault type or the syndrome information whether the fault was caused by (i) a loss of data integrity for the granule protection information, which does not necessarily mean the memory access request should have been rejected if the granule protection information had not been corrupted, or (ii) the memory access request being rejected because either the granule protection information is invalid or because the granule protection information indicates that the selected physical address space sought to be accessed by the memory access request is not an allowed physical address. This allows the handler to take different response actions.

The filtering circuitry may comprise requester-side filtering circuitry to determine, based on the granule protection information in the target granule protection entry, whether to allow the memory access request to be passed to a cache or passed to an interconnect for communicating with a completer device for servicing the memory access request. In comparison to performing the filtering of memory access requests based on granule protection information on the completer-side (after the memory access requests have been routed over the interconnect to a completer device such as a memory controller or peripheral controller for servicing the memory access request), an advantage of performing a granule protection lookup at the requester-side of the interconnect is that this can enable more fine-grained control over which physical addresses are accessible from a given physical address space than would be practical at the completer-side. This is because the completer-side may typically have relatively limited ability to access the memory system as a whole. For example, a memory controller for a given memory unit may only have access to the locations within that memory unit and may not have access to other regions of the address space. Providing more fine-grained control may rely on a more complex table of granule protection information which may be stored in the memory system and it may be more practical to access such a table from the requester side where there is more flexibility to issue memory access request to a wider subset of the memory system. Also, performing the granule protection lookup on the requester side can help enable the ability to dynamically update granule protection information at runtime, which may not be practical for completer-side filtering circuitry which may be restricted to accessing a relatively small amount of statically defined data defined at boot-time. Another advantage of requester-side filtering circuitry is that this would enable the interconnect to allocate different addresses within the same granule to different completer ports communicating with different completer devices (e.g. different DRAM (dynamic random access memory) units), which may be efficient for performance but may be impractical if the granule as a whole needs to be directed to the same completer unit so that the granule protection lookup can be performed on the completer side to verify whether a memory access is allowed. Hence there may be a number of advantages to performing the granule protection lookup for distinguishing whether a particular physical address can be accessed from a particular physical address space selected for a given memory access request at the requester side instead of the completer side.

Similarly, the integrity checking circuitry may comprise requester-side integrity checking circuitry to perform the data integrity check on the granule protection data block loaded from memory after the granule protection data block has been received from the interconnect. In cases where a memory protection engine comprising memory encryption circuitry is provided for applying encryption to data stored in a protected region of memory, the memory encryption circuitry may typically be implemented within the memory system at the interface to the memory storage hardware which is vulnerable to interception/tampering. This may typically be on the completer-side of the interconnect, not the requester side. In systems which provide a memory protection engine with capability for integrity verification applied to general data stored to the protected region of memory (e.g. based on authentication codes or other integrity metadata), that may also usually be managed from the memory protection engine on the completer-side. In contrast, the integrity checking circuitry described above may, in some embodiments, be on the requester-side, e.g. as part of a memory management unit or system memory management unit which comprises the filtering circuitry. Especially in implementations which use the data integrity check based on verification of whether granule protection information has one of the first subset of valid encodings or the second subset of invalid encodings, it can be more efficient to implement this on the requester side as this may be a bespoke type of verification specific to granule protection information rather than a more generic form of integrity verification that can be used for other data, so by incorporating the integrity checking logic into a system component on the requester-side that also comprises the filtering circuitry (and possibly the address translation as well), this can make system design simpler as the system component which will make use of the granule protection information also includes circuitry for ensuring that information's integrity before use. This avoids the need for system designers to take account of the data integrity verification when designing the completer-side components of a memory system.

The memory access requests may be issued by requester circuitry (e.g. processing circuitry) which is capable of operating in any of two or more domains of operation.

The selected physical address space associated with the memory access can be selected in different ways. In some examples, the selected physical address space may be selected (either by the address translation circuitry or by the filtering circuitry) based at least on a current domain of operation of the requester circuitry from which the memory access request was issued. The selection of the selected physical address space could also depend on physical address space selection information specified in at least one page table entry used for the translation of the target virtual address to the target physical address.

The address translation circuitry may restrict which physical address spaces are accessible depending on the current domain. When a particular physical address space is accessible to the current domain, this means that it is possible for the address translation circuitry to translate a virtual address specified for a memory access issued from the current domain into a physical address in that particular physical address space. This does not necessarily imply that the memory access would be allowed, as even if a particular memory access can have its virtual address translated into a physical address of a particular physical address space, the filtering circuitry may perform further checks based on the granule protection information to determine whether that physical address is actually allowed to be accessed within that particular physical address space. Nevertheless, by restricting which subset of physical address spaces are accessible to the current domain, this can provide stronger guarantees of security.

For example, the processing circuitry may support processing in a root domain which is responsible for managing switching between other domains in which the processing circuitry can operate. The root domain may have an associated root physical address space. By providing a dedicated root domain for controlling the switching, this can help to maintain security by limiting the extent to which code executing in one domain can trigger a switch to another domain. For example the root domain may perform various security checks when a switch of domain is requested. Hence, the processing circuitry may support processing being performed in one of at least three domains: the root domain, and at least two other domains.

When the data integrity check fails for the granule protection data block, the integrity checking circuitry may signal that the fault is to be handled by program code executed in the root domain. Hence, any issues of loss of data integrity may be managed by the root domain which is responsible for the isolation of physical address spaces and domains and may be considered to have the greatest level of security.

In some examples the processing circuitry may support two additional domains, in addition to the root domain. For example, the other domains may comprise a secure domain associated with a secure physical address space and a less secure domain associated with a less secure physical address space. The less secure physical address space may be accessible from each of the less secure domain, the secure domain and the root domain. The secure physical address space may be accessible from the secure domain and the root domain but may be inaccessible from the less secure domain. The root physical address space can be accessible to the root domain but may be inaccessible to the less secure domain and the secure domain. Hence, this allows code executing in the secure domain to have its code or data protected from access by code operating in the less secure domain with stronger security guarantees than if page tables were used as the sole security controlling mechanism. For example, portions of code which require stronger security can be executed in the secure domain managed by a trusted operating system distinct from a non-secure operating system operating in the less secure domain. An example of a system supporting such secure and less secure domains may be processing systems operating according to a processing architecture which supports the TrustZone® architecture feature provided by Arm® Limited of Cambridge, UK. In conventional TrustZone® implementations the monitor code for managing switching between secure and less secure domains uses the same secure physical address space that is used by the secure domain. In contrast, by providing a root domain for managing switching of other domains and assigning a dedicated root physical address space for use by the root domain, this helps to improve security and simplify system development.

However, in other examples, the other domains could include further domains, for example at least three other domains in addition to the root domain. These domains could include the secure domain and the less secure domain discussed above, but may also include at least one further domain associated with a further physical address space. The less secure physical address space may also be accessible from the further domain, while the further physical address space may be accessible from the further domain and the root domain but may be inaccessible from the less secure domain. Hence, similar to the secure domain, the further domain may be considered more secure than the less secure domain and allow further partitioning of code into respective worlds associated with distinct physical address spaces to limit their interaction.

In some examples the respective domains may have a hierarchy so that they are associated with increasing levels of privilege as the system ascends from the less secure domain, through the secure and further domains to the root domain, with the further domain being considered more privileged than the secure domain and so having access to the secure physical address space.

However, increasingly there is a desire for a software provider to be provided with a secure computing environment which limits the need to trust other software providers associated with other software executing on the same hardware platform. For example, there may be a number of uses in fields such as mobile payment and banking, enforcement of anti-cheating or piracy mechanisms in computer gaming, security enhancements for operating system platforms, secure virtual machine hosting in a cloud system, confidential computing, etc., where a party providing software code may not be willing to trust the party providing an operating system or hypervisor (components which might previously have been considered trusted). In a system supporting secure and less secure domains with respective physical address spaces, such as systems based on the TrustZone® architecture described above, with the increasing take-up of secure components operating in a secure domain, the set of software typically operating in the secure domain has grown to include a number of pieces of software which may be provided from a different number of software providers, including parties such as an original equipment manufacturer (OEM) who assembles a processing device (such as a mobile phone) from components including a silicon integrated circuit chip provided by a particular silicon provider, an operating system vendor (OSV) who provides the operating system running on the device, and a cloud platform operator (or cloud host) who maintains a server farm providing server space for hosting virtual machines on the cloud. Hence, if the domains were implemented in a strict order of increasing privilege, then there may be a problem because an application provider providing application-level code which wishes to be provided with a secure computing environment may not wish to trust a party (such as the OSV, OEM or cloud host) who might traditionally have provided software executing the secure domain, but equally the parties providing the code operating in a secure domain are unlikely to wish to trust application providers to provide code operating at a higher privilege domain which is given access to data associated with less privileged domains. Therefore, it is recognised that a strict hierarchy of domains of successively increasing privilege may not be appropriate.

Hence, in the more detailed examples below, the further domain may be considered to be orthogonal to the secure domain. While the further domain and the secure domain can each access the less secure physical address space, the further physical address space associated with the further domain is inaccessible from the secure domain, while the secure physical address space associated with the secure domain is inaccessible from the further domain. The root domain can still access the physical address spaces associated with both the secure domain and the further domain.

Hence, with this model the further domain (an example of which is the realm domain described in the examples below) and the secure domain have no dependencies upon each other and so do not need to trust each other. The secure domain and the further domain only need to trust the root domain, which is inherently trusted as it is managing the entry into the other domains.

While the examples below describe a single instance of the further domain (realm domain), it will be appreciated that the principle of a further domain orthogonal to the secure domain can be extended to provide multiple further domains so that each of the secure domain and at least two further domains can access the less secure physical address space, cannot access the root physical address space, and cannot access the physical address spaces associated with each other.

The less secure physical address space may be accessible from all of the domains supported by the processing circuitry. This is useful because it facilitates sharing of data or program code between software executing in different domains. If a particular item of data or code is to be accessible in different domains, then it can be allocated to the less secure physical address space so that it can be accessed from any of the domains.

The memory system may include a point of physical aliasing (PoPA), which is a point at which aliasing physical addresses from different physical address spaces which correspond to the same memory system resource are mapped (de-aliased) to a single physical address uniquely identifying that memory system resource. The memory system may include at least one pre-PoPA memory system component which is provided upstream of the PoPA, which treats the aliasing physical addresses as if they correspond to different memory system resources.

For example, the at least one pre-PoPA memory system component could include a cache or translation lookaside buffer which may cache data, program code or address translation information for the aliasing physical addresses in separate entries, so that if the same memory system resource is requested to be accessed from different physical address spaces, then the accesses will cause separate cache or TLB entries to be allocated. Also, the pre-PoPA memory system component could include coherency control circuitry, such as a coherent interconnect, snoop filter, or other mechanism for maintaining coherency between cached information at respective master devices. The coherency control circuitry could assign separate coherency states to the respective aliasing physical addresses in different physical address spaces. Hence, the aliasing physical addresses are treated as separate addresses for the purpose of maintaining coherency even if they do actually correspond to the same underlying memory system resource. Although on the face of it, tracking coherency separately for the aliasing physical addresses could appear to cause a problem of loss of coherency, in practice this is not a problem because if processes operating in different domains are really intended to share access to a particular memory system resource then they can use the less secure physical address space to access that resource (or use the restrictive sharing feature described below to access the resource using one of the other physical address spaces). Another example of a pre-PoPA memory system component may be a memory protection engine which is provided for protecting data saved to off-chip memory against loss of confidentiality and/or tampering. Such a memory protection engine could, for example, separately encrypt data associated with a particular memory system resource with different encryption keys depending on which physical address space the resource is accessed from, effectively treating the aliasing physical addresses as if they were corresponding to different memory system resources (e.g. an encryption scheme which makes the encryption dependent on the address may be used, and the physical address space identifier may be considered to be part of the address for this purpose).

Regardless of the form of the pre-PoPA memory system component, it can be useful for such a PoPA memory system component to treat the aliasing physical addresses as if they correspond to different memory system resources, as this provides hardware-enforced isolation between the accesses issued to different physical address spaces so that information associated with one domain cannot be leaked to another domain by features such as cache timing side channels or side channels involving changes of coherency triggered by the coherency control circuitry.

It may be possible, in some implementations, for the aliasing physical addresses in the different physical address spaces to be represented using different numeric physical address values for the respective different physical address spaces. This approach may require a mapping table to determine at the PoPA which of the different physical address values correspond to the same memory system resource. However, this overhead of maintaining the mapping table may be considered unnecessary, and so in some implementations it may be simpler if the aliasing physical addresses comprise physical addresses which are represented using the same numeric physical address value in each of the different physical address spaces. If this approach is taken then, at the point of physical aliasing, it can be sufficient simply to discard the physical address space identifier which identifies which physical address space is accessed using a memory access, and then to provide the remaining physical address bits downstream as a de-aliased physical address.

Hence, in addition to the pre-PoPA memory system component, the memory system may also include a PoPA memory system component configured to de-alias the plurality of aliasing physical addresses to obtain a de-aliased physical address to be provided to at least one downstream memory system component. The PoPA memory system component could be a device accessing a mapping table to find the dealiased address corresponding to the aliasing address in a particular address space, as described above. However, the PoPA component could also simply be a location within the memory system where the physical address tag associated with a given memory access is discarded so that the physical address provided downstream uniquely identifies a corresponding memory system resource regardless of which physical address space this was provided from. Alternatively, in some cases the PoPA memory system component may still provide the physical address space tag to the at least one downstream memory system component (e.g. for the purpose of enabling completer-side filtering as discussed further below), but the PoPA may mark the point within the memory system beyond which downstream memory system components no longer treat the aliasing physical addresses as different memory system resources, but consider each of the aliasing physical addresses to map the same memory system resource. For example, if a memory controller or a hardware memory storage device downstream of the PoPA receives the physical address tag and a physical address for a given memory access request, then if that physical address corresponds to the same physical address as a previously seen transaction, then any hazard checking or performance improvements performed for respective transactions accessing the same physical address (such as merging accesses to the same address) may be applied even if the respective transactions specified different physical address space tags. In contrast, for a memory system component upstream of the PoPA, such hazard checking or performance improving steps taken for transactions accessing the same physical address may not be invoked if these transactions specify the same physical address in different physical address spaces.

The techniques discussed above can be implemented in a hardware apparatus which has hardware circuitry logic for implementing the functions as discussed above. Hence, the processing circuitry and the address translation circuitry may comprise hardware circuit logic. However, in other examples a computer program for controlling a host data processing apparatus to provide an instruction execution environment for execution of target code may be provided with processing program logic and address translation program logic which performs, in software, equivalent functions to the processing circuitry and address translation circuitry discussed above. This can be useful, for example, for enabling target code written for a particular instruction set architecture to be executed on a host computer which may not support that instruction set architecture. Hence, functionality expected by the instruction set architecture which is not provided by the host computer could be emulated instead by simulation software providing an equivalent instruction execution environment for the target code as would be expected if the target code had been executed on the hardware device which actually supports the instruction set architecture. Hence, address translation program logic, granule protection entry loading program logic, filtering program logic and integrity checking logic may be provided to emulate the functionality of the address translation circuitry, granule protection entry loading circuitry, filtering circuitry and integrity checking circuitry described earlier. For the approach where a simulation of the architecture is provided, the respective physical address spaces are simulated physical address spaces because they do not actually correspond to physical address spaces identified by hardware components of the host computer, but would be mapped to addresses within the virtual address space of the host. Providing such a simulation can be useful for a range of purposes, for example for enabling legacy code written for one instruction set architecture to be executed on a different platform which supports a different instruction set architecture, or for assisting with software development of new software to be executed for a new version of an instruction set architecture when hardware devices supporting that new version of the instruction set architecture are not available yet (this can enable the software for the new version of the architecture to start to be developed in parallel with development of the hardware devices supporting the new version of the architecture).

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one or more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. Granule protection entry loading circuitry (also known as Granule Protection Table loading or GPT loading circuitry) 21 loads blocks of data comprising granule protection information from memory. Integrity of the loaded blocks of granule protection information is checked by integrity checking circuitry 23 as discussed further below. The granule protection information may be cached within a granule protection information cache 22, similar to caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
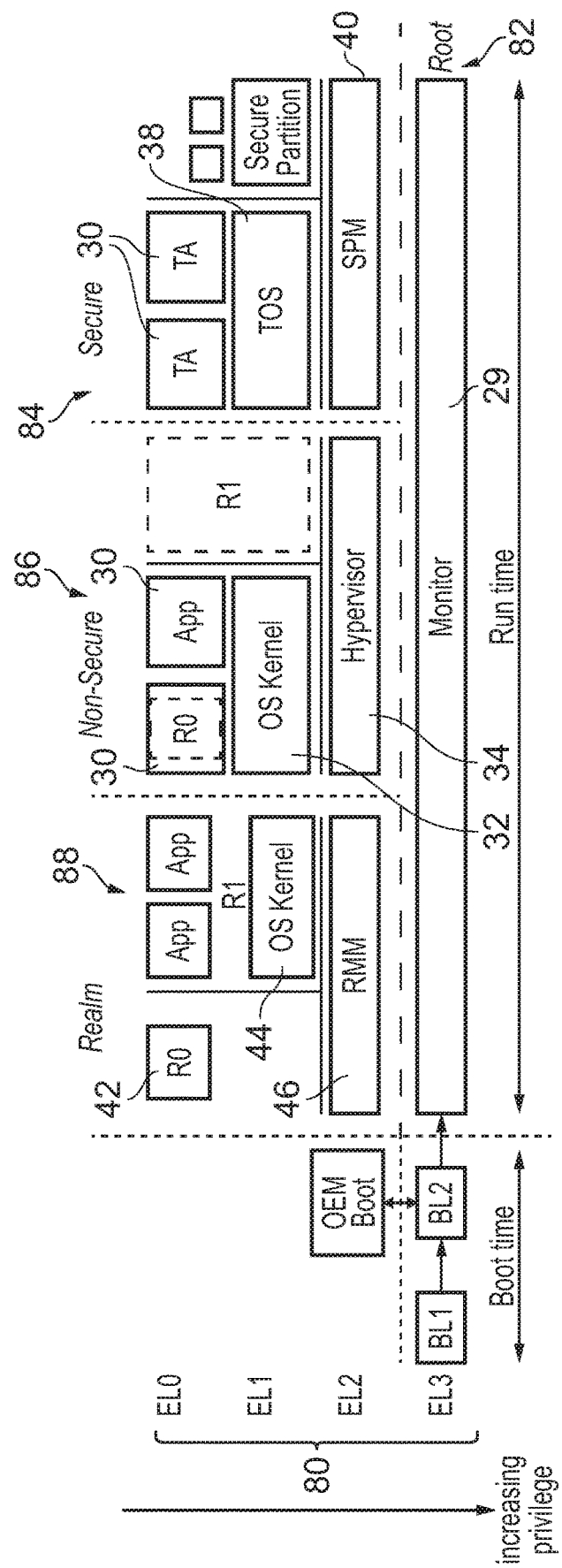
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain.

However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
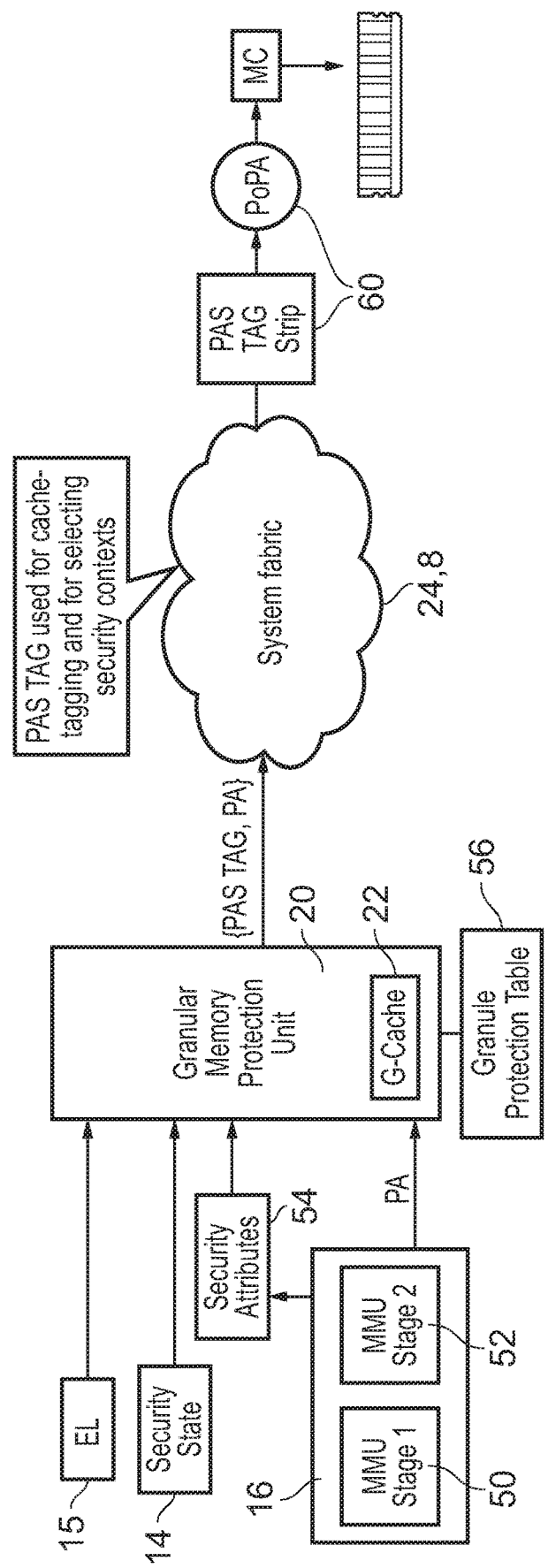
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GM PU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

Figure 4:
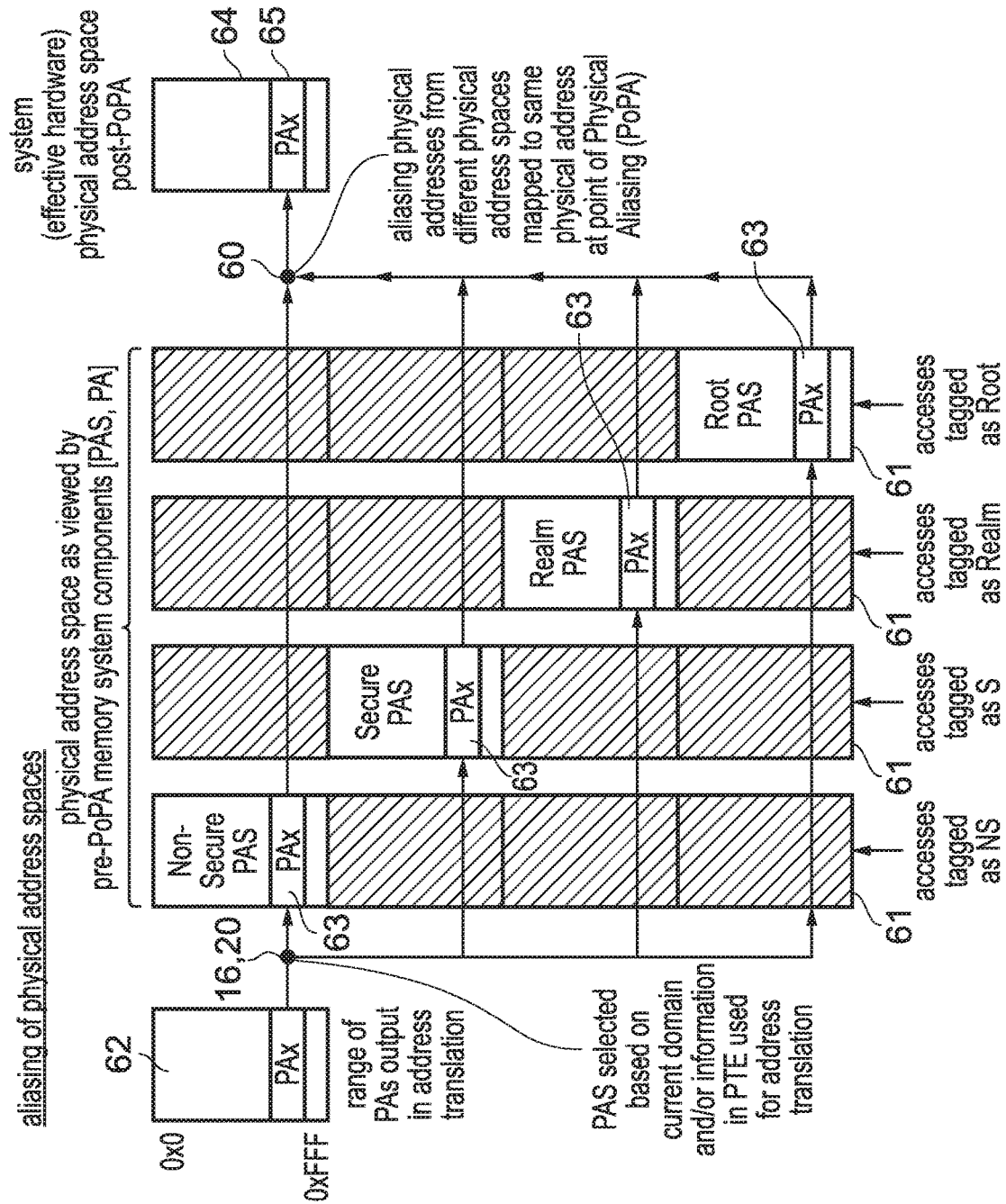
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
|---|---|---|---|---|
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

Figure 14:
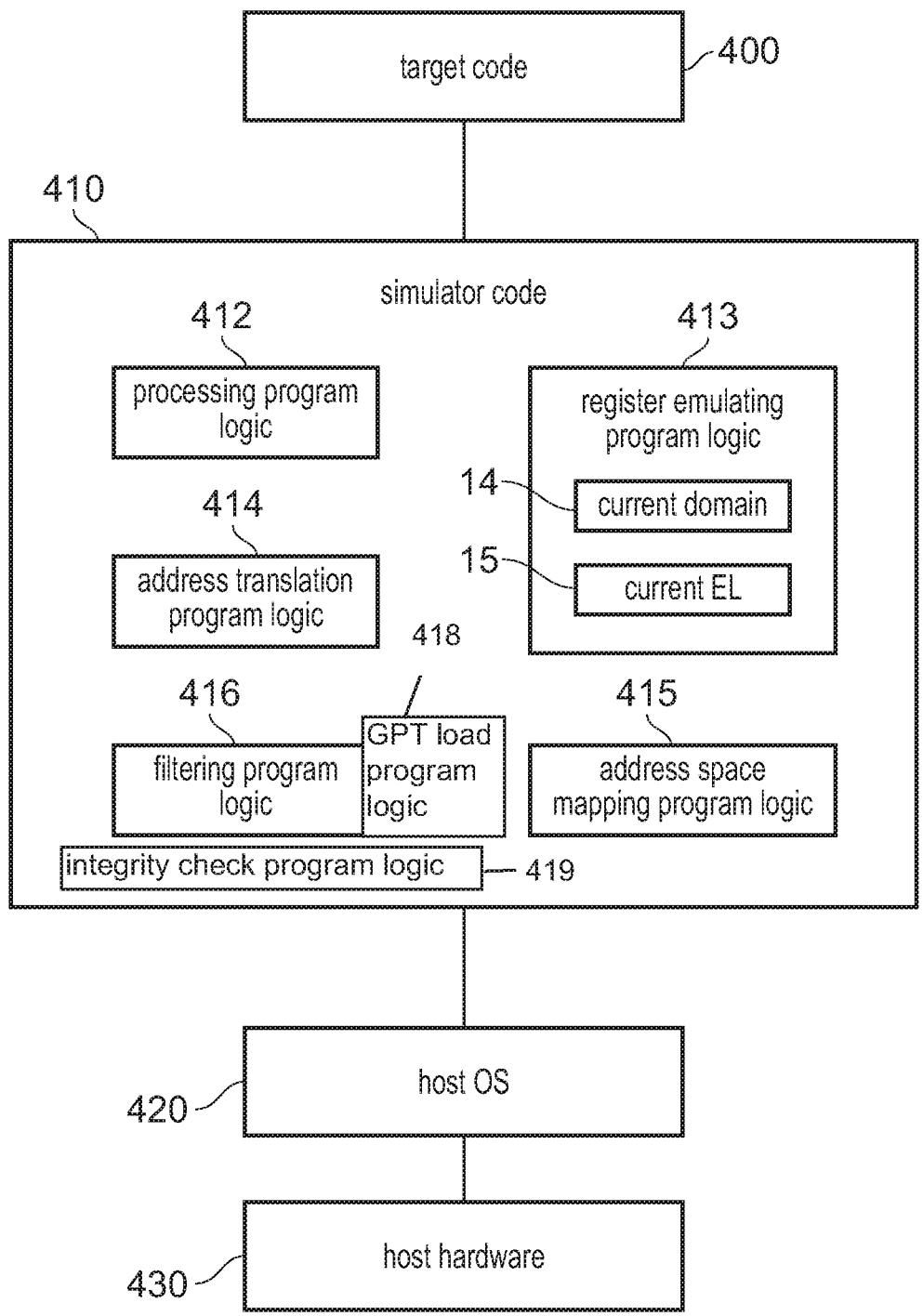
FIG. 14 shows a simulator example that may be used.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Figure 5:
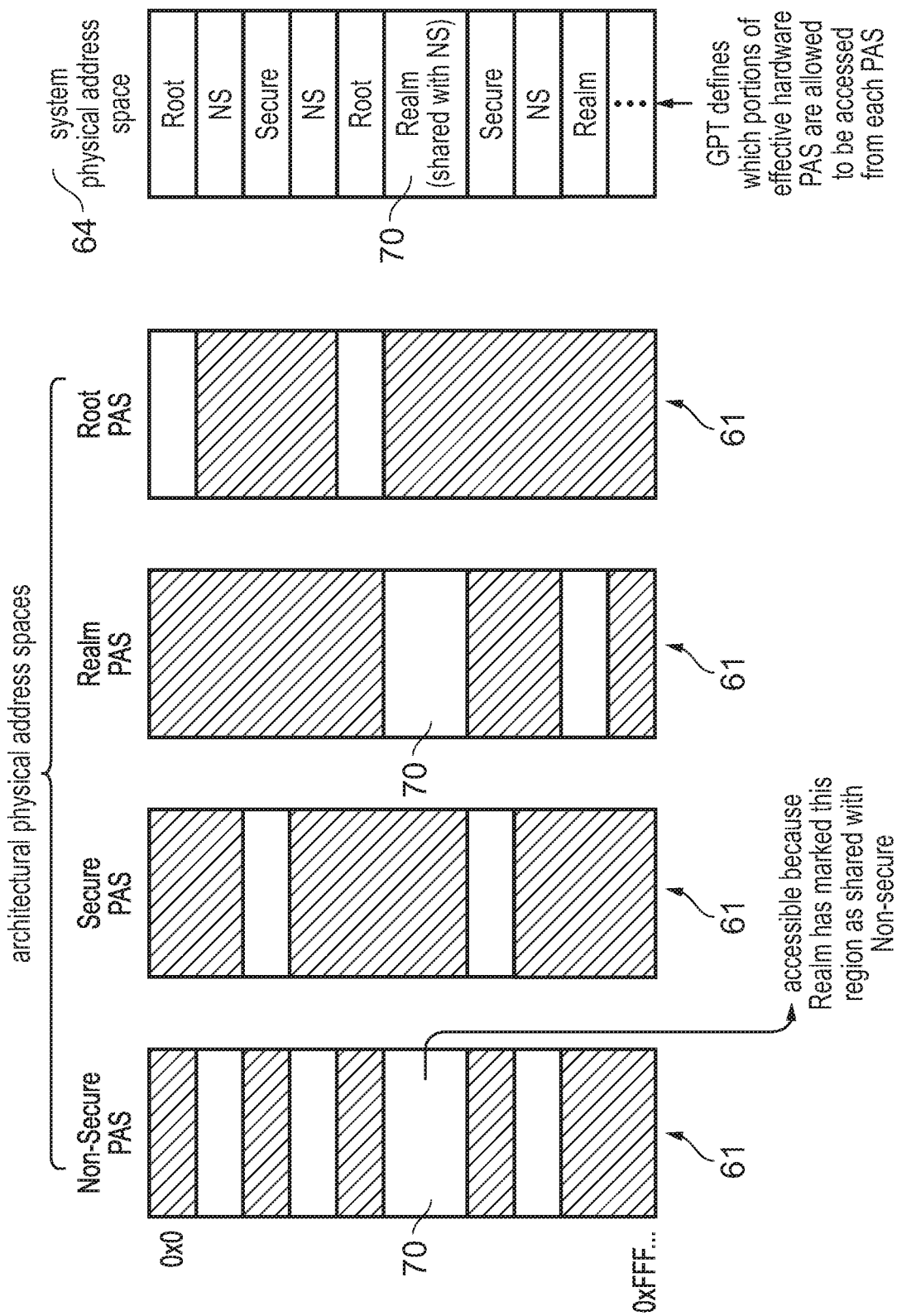
FIG. 5 illustrates an example of partitioning the effective hardware physical address space so that different architectural physical address spaces have access to respective portions of the system physical address space.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Figure 6:
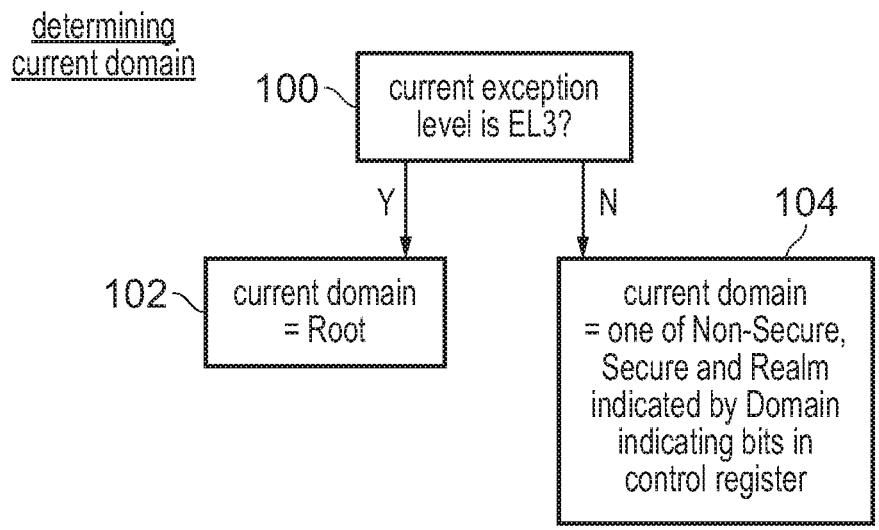
FIG. 6 is a flow diagram illustrating a method of determining the current domain of operation of the processing circuitry.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

Figure 7:
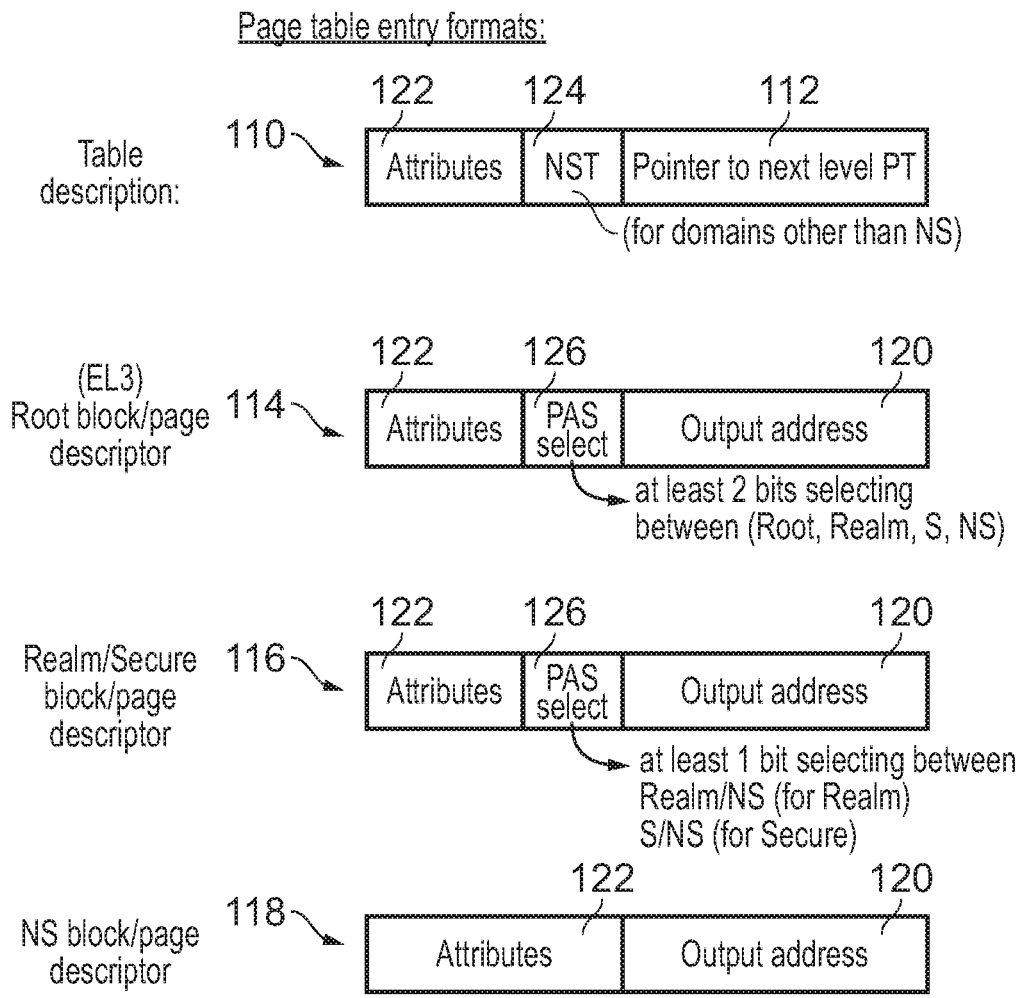
FIG. 7 shows examples of page table entry formats for page table entries used for translating virtual addresses to physical addresses.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same positon within the PTE, regardless of whether the current domain is realm or secure, so that the PAS selection bit 126 can be shared.

Figure 8:
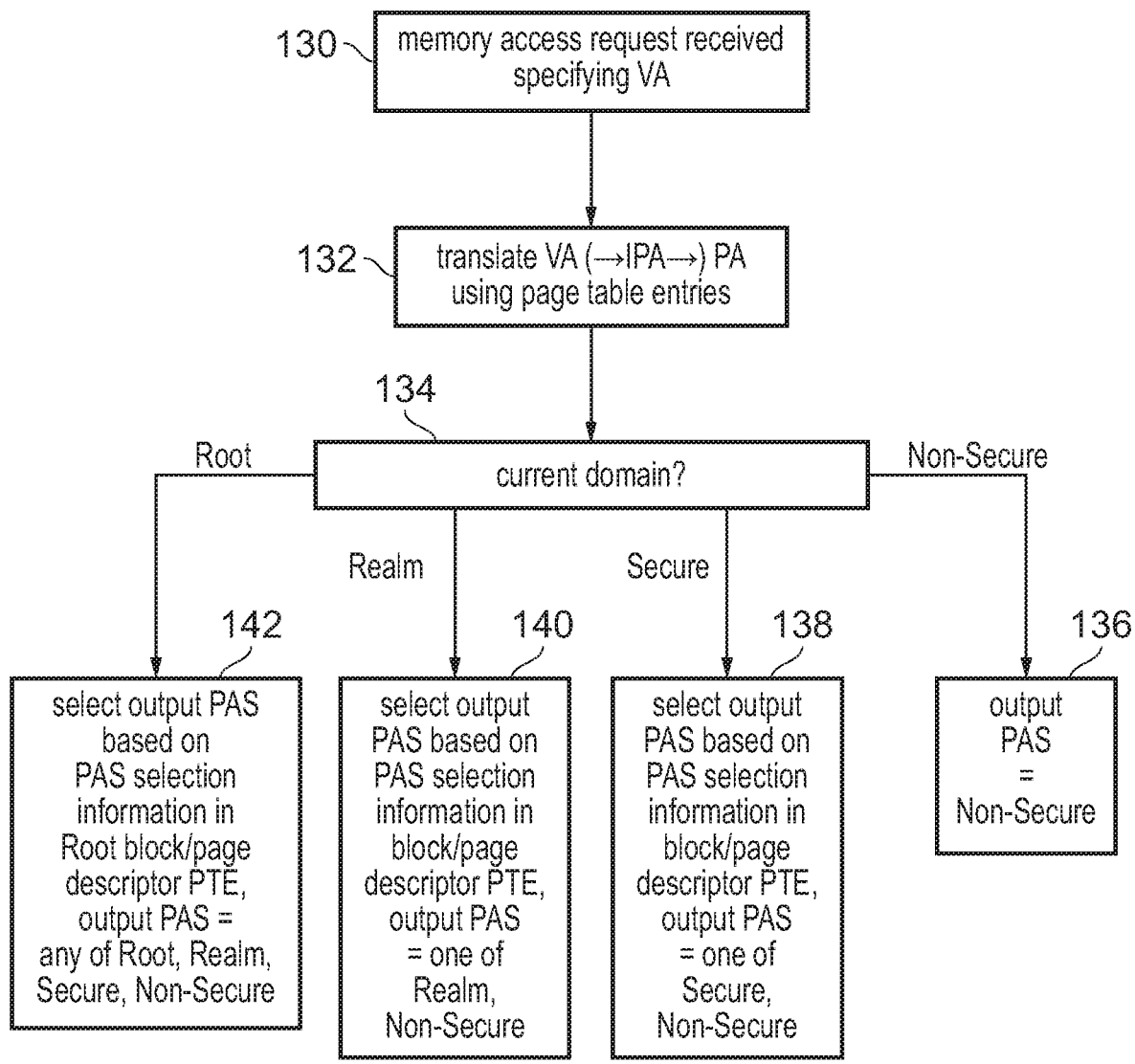
FIG. 8 is a flow diagram showing a method of selecting a physical address space to be accessed by a given memory access request.

Hence, FIG. 8 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descriptor PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

Figure 9:
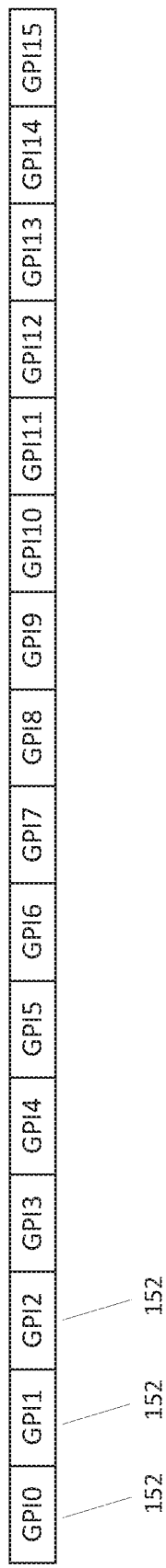
FIGS. 9 and 10 illustrate two examples of granule protection data blocks comprising a number of granule protection entries.

FIG. 9 illustrates an example of a granule protection data block 150 providing granule protection entries 152 corresponding to a number of granules of physical address space. In this example, a 64-bit granule protection data block 150 comprises 16 granule protection entries (GPEs) 152 each providing 4-bit granule protection information (GPI).

Within the 4 bits of encoding space provided for each GPE (providing 16 possible encodings), a certain number of encodings may be defined as valid encodings to indicate valid options for the granule protection information. For example, 7 of the 16 encodings available may be allocated for encoding the following valid items of granule protection information:

access is permitted to the Root PAS, and prohibited for the other PASs;
access is permitted to the Secure PAS, and prohibited for the other PASs;
access is permitted to the Realm PAS, and prohibited for the other PASs;
access is permitted to the Non-Secure PAS, and prohibited for the other PASs;
access is permitted to any PAS if the current exception level is EL3, and prohibited for any PAS if the current exception level is EL0, EL1 or EL2;
access is permitted to any PAS;
access is prohibited for all PAS (this encoding may also be used if the GPE is invalid).

It will be appreciated that which particular 4-bit encoding of the GPI is used for each of these options is an arbitrary design choice for the instruction set architecture designer—any mapping of the respective encodings onto 4-bit values of the GPI field can be used.

It will also be appreciated that these are just some options for possible valid pieces of granule protection information, and other options could also be supported or some of these options could be omitted for some architecture implementations. For example, if the "Restrictive Shared" semantic is implemented as discussed above, additional encodings could be allocated to indicate the sharing—e.g. an encoding could indicate that access is permitted to the Realm PAS and the Non-Secure PAS (indicating that while the granule would normally be allocated to the Realm PAS, the Realm domain has previously made a request to the Root Domain to indicate that the granule is shared with the Non-Secure PAS).

In general, there may be some spare invalid encodings which are not used to indicate valid options for the GPI. These spare invalid encodings may arise either due to the number of valid options not being an exact power of 2, or because the architecture designer left room for future expansion, or as a deliberate design choice to increase the probability that loss of data integrity can be detected based on analysis similar to the quantitative analysis provided below.

In the example above, there are 9 of the 16 available encodings that are invalid. This can be exploited to provide a data integrity check as discussed below.

The data integrity check determines, for each GPE in the loaded block, whether the GPE has one of the valid GPI encodings or one of the invalid GPI encodings. If any of the GPEs in the block has an invalid GPI encoding (even if it is not the GPE required for dealing with a current memory access request), a data integrity fault is signalled. If all of the GPEs have valid GPI encodings then it is assumed that the data is valid and can be trusted.

When a data block 150 providing a number of granule protection entries is loaded from a region of memory potentially prone to tampering by an attacker, then it may be assumed that the granule protection data block would have been encrypted prior to writing to that region of memory. The encryption primitive used for the encryption/decryption may operate on a block of data which is of corresponding size to the granule protection data block 150. If an attacker causes a single bit to flip state in the encrypted data in memory (DRAM), e.g. by performing a Rowhammer style attack, the diffusive property of the cryptographic functions typically used for memory encryption may mean that changing a single bit in the ciphertext stored in memory causes randomised plaintext to be output by the decryption function on reading the modified encrypted data back from memory later on. Hence, the decrypted data which results from decryption after the attacker has tampered with the ciphertext can be assumed to be a random string of bits.

Hence, considering that the output of the decryption may effectively be considered to be random if an attacker tampers with the ciphertext data stored in memory, the probability that all of the resulting plaintext GPEs after the modification by the attacker end up having valid encodings of the GPI is as follows (evaluated for 16 4-bit GPEs within a 64-bit GPT block):

| X, Number of Invalid Encodings out of 16 | Probability of single GPI set to random value being valid | $P_{non-f}$, Probability of no fault for GPT block as a whole (i.e. probability that all 16 GPEs in GPT block are valid when set to random values) | $P_{non-f}$ as % | $1/P_{non-f}$ |
|---|---|---|---|---|
| 0 | 1 | 1 | 100% | 1 |
| 1 | 0.9375 | 0.35607413 | 35.61% | 3 |
| 2 | 0.875 | 0.11806709 | 11.81% | 8 |
| 3 | 0.8125 | 0.03607231 | 3.61% | 28 |
| 4 | 0.75 | 0.0100226 | 1.00% | 100 |
| 5 | 0.6875 | 0.00249094 | 0.25% | 401 |
| 6 | 0.625 | 0.0005421 | 0.05% | 1845 |
| 7 | 0.5625 | 0.00010045 | 0.01% | 9955 |
| 8 | 0.5 | 1.5259E−05 | 0.00% | 65536 |
| 9 | 0.4375 | 1.8016E−06 | 0.00% | 555074 |
| 10 | 0.375 | 1.5293E−07 | 0.00% | 6538825 |

Hence, for the example above with 9 invalid encodings, there is only a 1 in 555074 chance that an attacker tampering with even one bit of the data stored in memory is able to evade the data integrity check.

The probability will vary depending on the number of invalid encodings and the number of GPEs in one data block which is loaded from memory in one transaction (and subject to encryption as a common operation across the whole block).

More generally, for N-bit GPI per GPE, X of the $2^N$ encodings of GPI being invalid, and Y GPEs per block, the probability of random output not producing any faults would be $$\left(1 - \frac{X}{2^N}\right)^Y,$$

so architecture designers can select N, X and Y as desired to provide an acceptable level of risk. For example, if 1 in 555074 is considered too high a risk in the example described above, this could be adjusted by either providing one additional redundant bit per GPE so as to increase the number of invalid encodings X, or by grouping together a larger number Y of GPEs in each granule protection data block. For example, if instead of dealing with 16 GPEs, the encryption and data integrity checks was applied to an entire 64-byte cache line comprising 128 4-bit GPEs, then this would increase the probability of no fault from $((16-X)/16)$ ^16 to $((16-X)/16)$^128, so even if X was 2, with only 2 out of 16 values as invalid, the chance of not faulting would be reduced to 1 in 26 million.

Clearly, the exact number of invalid encodings and number of GPEs per data block is a matter of design choice, but this demonstrates the principle that a simple check of whether the encoding of each GPE in the loaded block is invalid can be enough to enforce data integrity. Hence, as shown in FIG. 1, the PAS filter 20 may have granule protection entry loading circuitry (GPT loading circuitry) 21 which loads a granule protection data block 150 from memory when a GPE required for checking a memory access to a target PA is not already available in the granule protection information cache 22, and integrity checking circuitry 23 for performing the data integrity check on the loaded granule protection data block 150. For example, the integrity checking circuitry 23 may comprise a set of Boolean logic gates for checking whether the value of each GPE in the loaded block is one of the invalid encodings, and triggering signalling of the fault if any of the GPEs has an invalid encoding. This avoids the cost of calculating authentication codes and maintaining an integrity tree of metadata for verifying integrity, which greatly improves performance.

In an example where the integrity scheme based on checking of valid/invalid encodings is enabled, the software that manages the GPT tables (executing in the root domain) may be required to ensure that every GPE within a block has a valid encoding, not just the GPEs corresponding to granules of physical addresses currently in use. This requirement may not be enforced by any circuitry in hardware (there may not be any check on writing GPT data to memory of whether the GPE encodings are valid—as the root domain code is trusted code operating at EL3 and attested using the attestation mechanisms described above, it can be trusted to set the GPT data in an appropriate manner).

Figure 10:
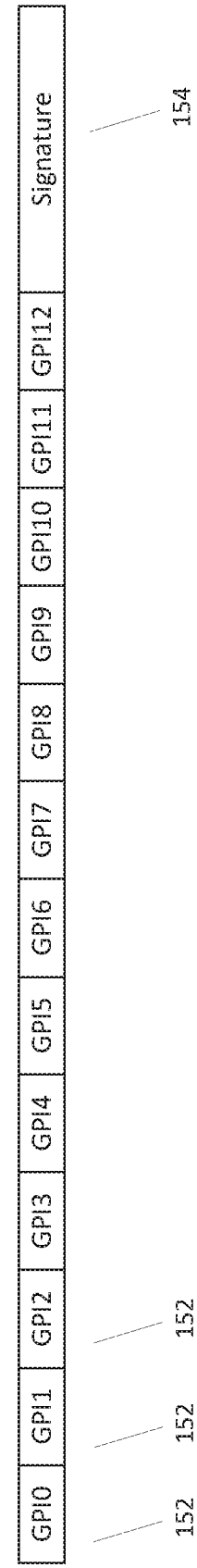

FIG. 10 shows an alternative technique for data integrity verification. In this example, a block 150 of GPEs 152 is associated with a signature 154 which is calculated when the block is written to memory, by applying a hash function or other authentication code generating function to the contents 152 of the GPT data block 150. In this example, the signature 154 is stored alongside the GPEs in memory (so that the signature is loaded from memory when the block is read), but the signature 154 could also be stored at a different storage location from the associated block of GPEs 152. When reading the block of GPEs from memory, after decrypting the GPEs 152 (and the signature if it is stored as part of the same block), a signature checking value is calculated from the read values of the GPEs 152 and compared with the previously stored integrity signature 154, and if a mismatch between the previously stored signature 154 and the signature checking value is detected then the fault is signalled to indicate loss of data integrity. If the signature 154 matches the signature checking value then the GPT data block 150 can be cached by the filtering circuitry 20 or used for filtering of memory accesses. With this approach, if the signature 154 is not stored in memory within the boundary of trust (the boundary of trust representing a boundary beyond which data may be considered vulnerable to attack), then further integrity metadata may need to be stored for enabling the signature to be verified, to protect against an attacker replacing the GPEs 152 and the signature 154 with different GPE values and a different matching signature. For example, a tree of signatures may be used to combine signatures 154 for different GPT data blocks 150, with each tree node protecting the signatures in the tree node at a lower level, until eventually the signatures can be traced back to the root of the tree which may correspond to a signature stored within the boundary of trust. In this case, there may be a greater performance overhead in verifying the integrity of the GPT block 150 as it may be needed to perform a string of verifications traversing up the tree to check that each of the intervening signatures is valid, before the integrity of the GPT block can be confirmed.

Figure 11:
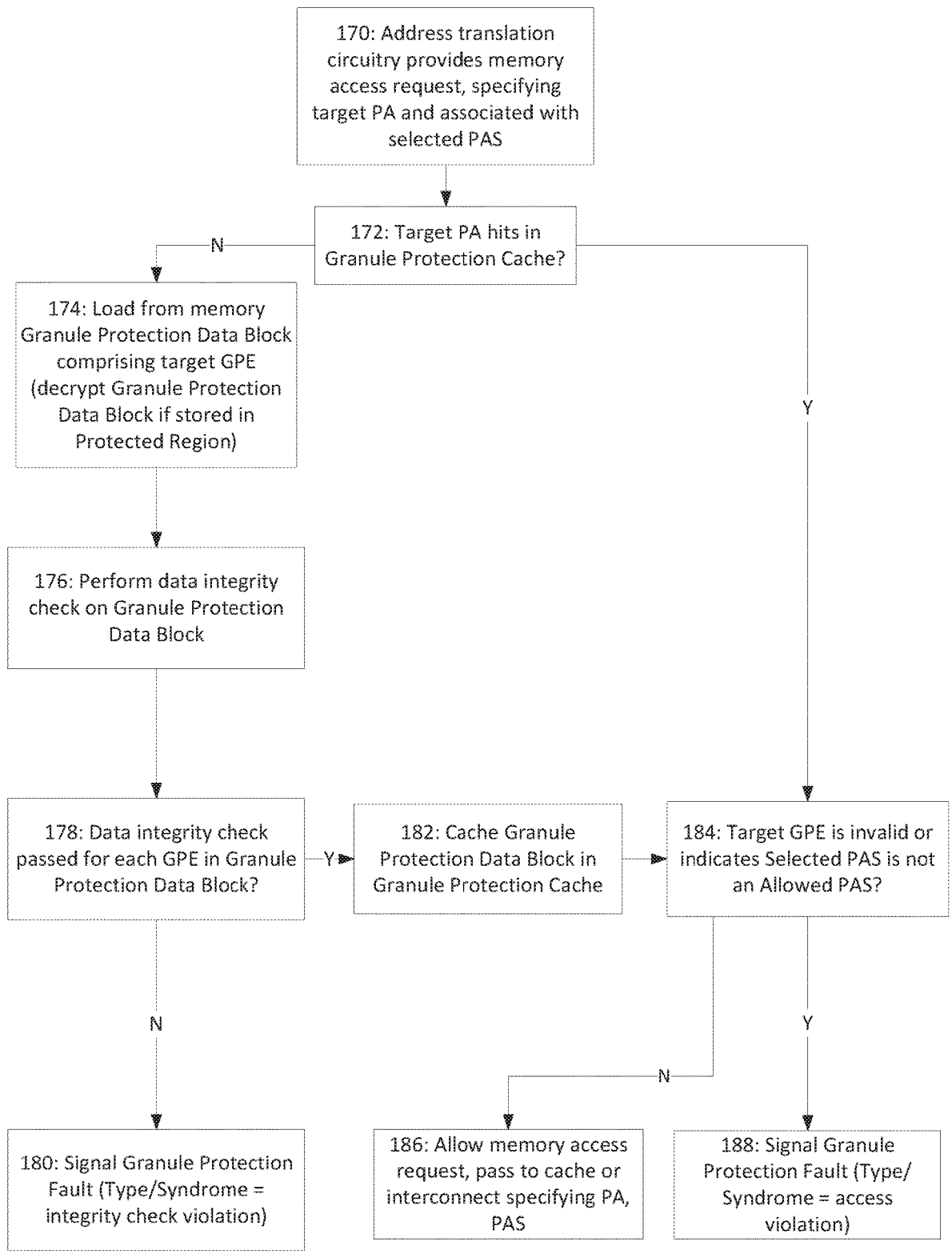
FIG. 11 is a flow diagram illustrating filtering of memory access requests based on the granule protection information and data integrity checking for granule protection information.

FIG. 11 is a flow diagram illustrating filtering of memory access requests by the filtering circuitry 20. At step 170 a memory access request is received from the address translation circuitry 16 (assuming any permission checks performed by the address translation circuitry have already passed), specifying a target PA and associated with a selected PAS. As mentioned above, the selected PAS could be indicated by the address translation circuitry providing an explicit identifier indicating the selected PAS, or by the address translation circuitry 16 forwarding the PAS selection information 126 read from the page tables which together with an indication of the current domain of the processing circuitry 10 can be used to determine the selected PAS at the filtering circuitry 20.

At step 172 the filtering circuitry 20 looks up the granule protection information cache 22, to determine whether the GPE required for the target PA is already accessible. If not, then at step 174 the granule protection entry loading circuitry 21 issues load requests to request from memory the granule protection data block comprising the target GPE which corresponds to the granule of PAs including the target PA. If the GPT is a single-level linearly-indexed table then the address of the granule protection data block can be determined from a GPT base address and an offset derived from the target PA. If the GPT is a multi-level structure similar to the page table structure used by the address translation circuitry 16, then the GPT base address and target PA can be used to derive the address of a first-level GPT entry which acts as a table descriptor providing a pointer to a further-level granule protection table, and by walking through one or more further levels of granule protection table eventually the granule protection data block can be located in memory. Any memory access requests issued during the GPT walk do not themselves require PAS checking, as the filtering circuitry 20 (GM PU) may be trusted to issue correct GPT memory accesses (in contrast to page table walk accesses issued by the address translation circuitry 16 which are subject to PAS checking and so may cause GPT lookups similar to regular memory access requests issued by the processing circuitry).

Figure 13:
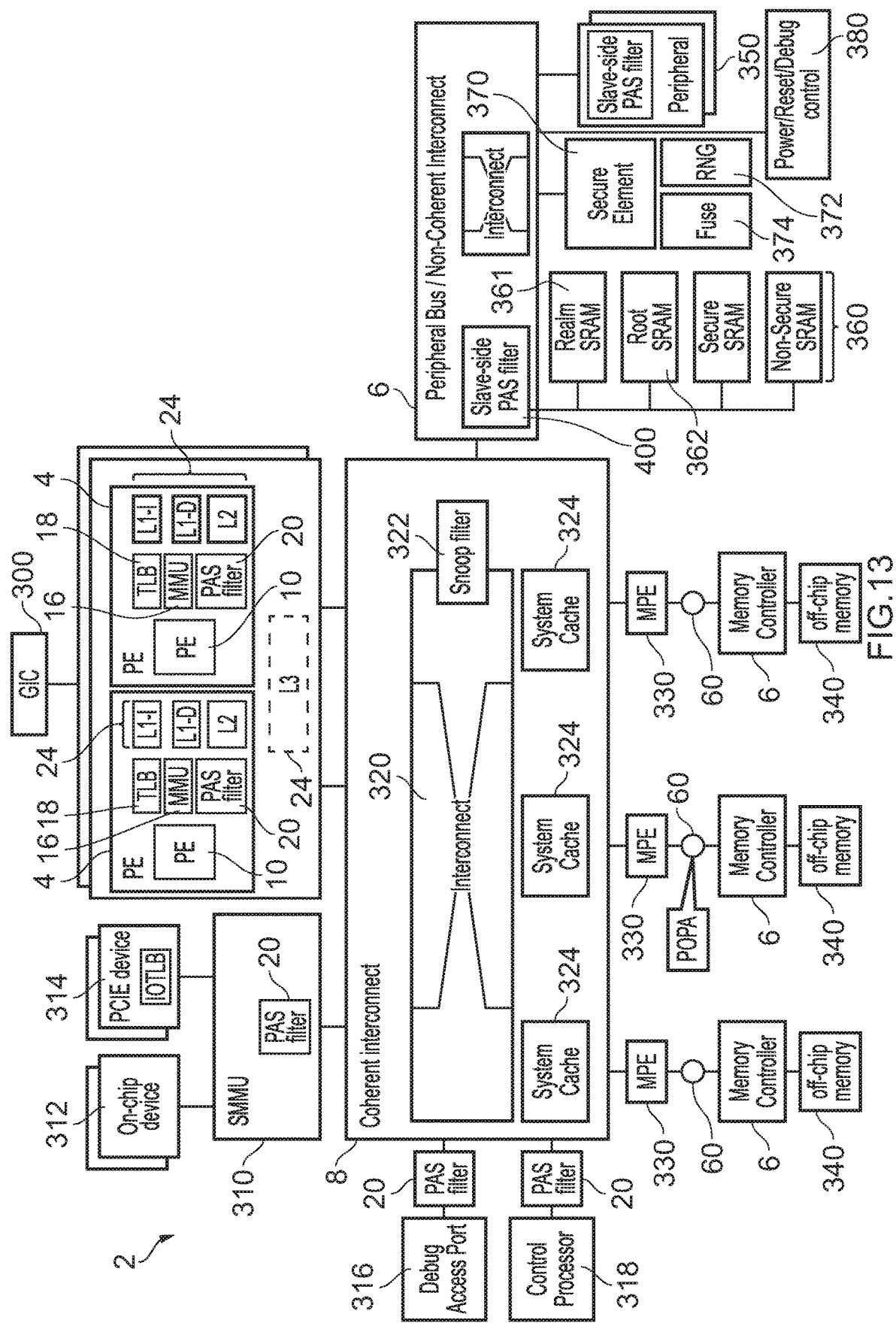
FIG. 13 illustrates an example of a data processing system.

If any blocks of granule protection information are stored in a protected region of memory that is subject to memory encryption, then on reading the information from memory decryption is applied by a memory protection engine 330 (memory encryption circuitry) as shown in FIG. 13 described further below, before providing the decrypted data to the filtering circuitry 20.

In an implementation which does not support caching of granule protection entries, step 172 could be omitted and the method could proceed direct from step 170 to step 174 (in this case every memory access request may need granule protection information to be loaded).

At step 176, for any received granule protection data block obtained from the memory system as part of the GPT lookup, the integrity checking circuitry 23 performs the data integrity check to determine whether the received granule protection data block is at risk of having been tampered with. As discussed above, in some implementations, this check may simply comprise checking whether each GPE in the obtained Granule Protection Data Block has a valid encoding, and the check may be considered to fail if any GPE in the Granule Protection Data Block has an invalid encoding. Alternatively, the data integrity check may check whether an integrity signature checking value derived from the obtained block matches a previously stored integrity signature associated with the block, and may be considered to fail if there is a mismatch between the checking value and the previously stored integrity signature.

At step 178 it is determined whether the data integrity check passed or failed. If the data integrity check failed, then at step 180 the integrity checking circuitry 23 triggers signalling of a granule protection fault, associated with a fault type or syndrome information which indicates that the fault was caused by an integrity check violation. The fault is signalled to be of a type which is handled by exception handler code executed at EL3, so that the root domain code deals with the fault. For example, the root domain code may trigger a system reset or other action for preventing the system continuing to function in the presence of a possible attack. The root domain code may also cause the fault to be reported to a system operator or provider of the software being executed, for example. The exact actions taken on signalling of the fault may vary depending on the needs of a particular implementation.

On the other hand, if the data integrity check passed, then at step 182 the obtained granule protection data block can be cached in the granule protection information cache 22, and at step 184 the GPE corresponding to the target PA can be extracted from the obtained granule protection data block and used to check whether the memory access request received at step 170 is allowed to proceed. If at step 172 the target PA hits in the granule protection information cache 22, then steps 174-182 can be omitted and instead the method proceeds direct to step 184 using the target GPE obtained from the granule protection information cache 22.

Regardless of whether the target GPE was already cached or was obtained from memory and passed the data integrity check, at step 184 the filtering circuitry 184 identifies based on the GPI in the target GPE whether the target GPE is invalid or indicates that the selected PAS associated with the memory access request is not an allowed PAS for the corresponding granule of physical addresses. If the target GPE is valid and indicates that the selected PAS is an allowed PAS, then at step 186 the filtering circuitry 20 allows the memory access request to proceed, and passes the memory access request to the cache(s) 24 or interconnect 8 along with an indication of the PA and the PAS associated with the memory access request. If the target GPE is invalid or indicates that the selected PAS is not an allowed PAS, then at step 188 the filtering circuitry 20 triggers signalling of a granule protection fault which is associated with a fault type or syndrome information which indicates that the fault was caused by an access violation where the memory access request did not meet the requirements indicated in the target GPE. Again, the granule protection fault is signalled to be handled by program code operating in the root domain at EL3, but is distinguished by the fault type or syndrome information from the fault signalled at step 180 due to a data integrity violation, so that the root domain code can take different actions in response to the fault.

Figure 12:
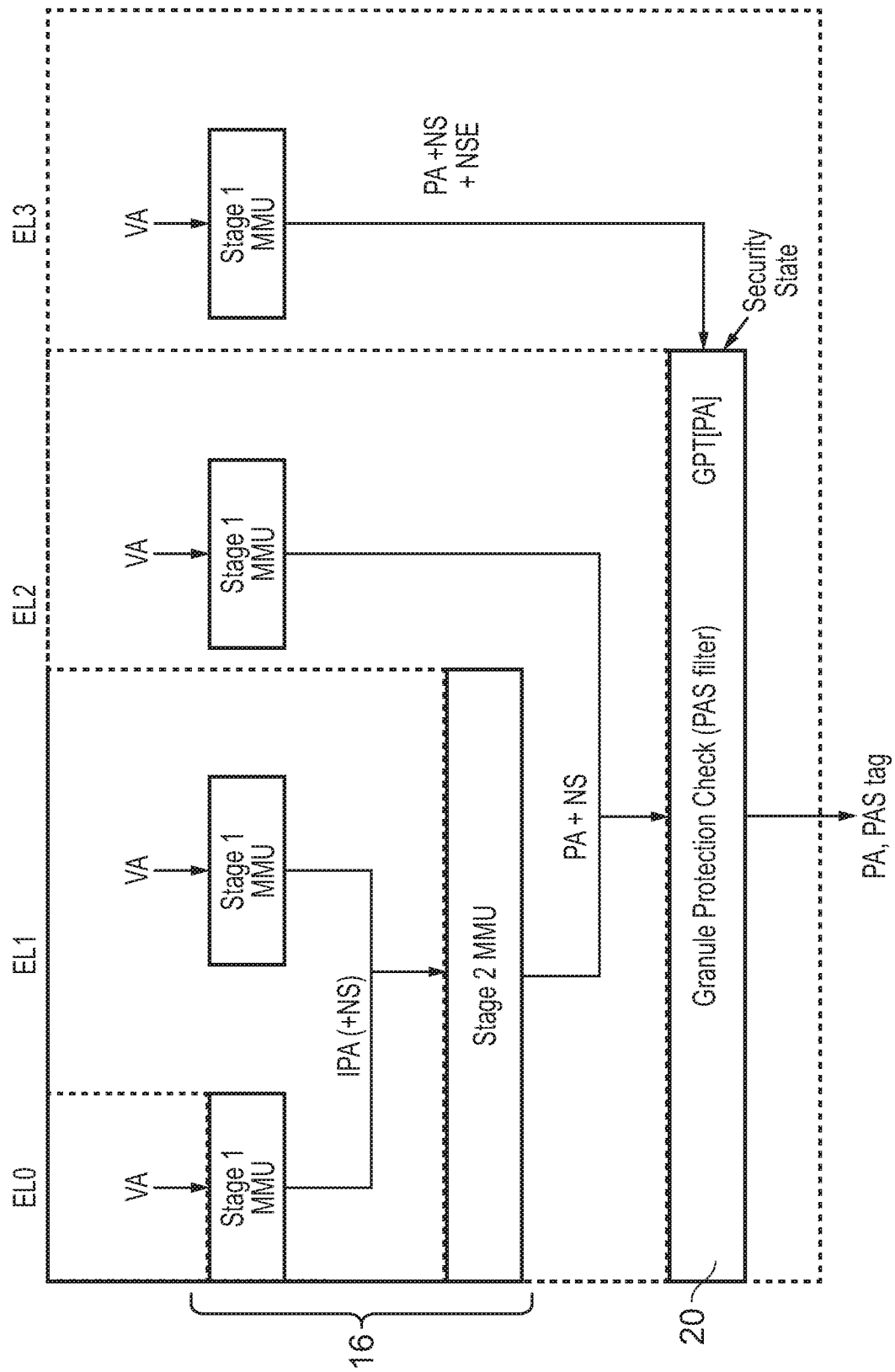
FIG. 12 illustrates a number of stages of address translation and granule protection information filtering.

FIG. 12 summarises the operation of the address translation circuitry 16 and PAS filter. The PAS filtering 20 can be regarded as an additional stage 3 check performed after the stage 1 (and optionally stage 2) address translations performed by the address translation circuitry. Note also that the EL3 translations are based on page table entries which provide two bits of address based selection information (labelled NS,NSE in the example of FIG. 12), while a single bit of selection information "NS" is used to select the PAS in the other states. The security state indicated in FIG. 12 as input to the granule protection check refers to the Domain ID identifying the current domain of the processing element 4.

FIG. 13 shows a more detailed example of a data processing system which may implement some of the techniques discussed above. The elements which are the same as in earlier examples are illustrated with the same reference numerals. In the example of FIG. 13 the processing elements 4 are shown in more detail, in that in addition to the processing circuitry 10, address translation circuitry 16, TLB 18 and PAS filter 20, the caches 24 are shown in more detail including a level 1 instruction cache, level 1 data cache, level 2 cache, and optionally a shared level 3 cache 24 shared between processing elements. An interrupt controller 300 may control handling of interrupts by the respective processing elements.

As shown in FIG. 13, the processing elements 4, which are capable of executing program instructions to trigger accesses to memory, are not the only type of requesting device which may be provided with a requester-side PAS filter 20. In other examples, a system MMU 310 (which is provided for providing address translation functionality for requesting devices 312, 314 which do not support their own address translation functionality, such as an on-chip device 312 such as a network interface controller or display controller, or off-chip device 314 which may communicate with the system via a bus) may be provided with a PAS filter 20 to perform requester-side checking of GPT entries the same as for the PAS filter 20 in the processing elements 4. Other requesting devices could include a debug access port 316 and a control processor 318 which may again have PAS filters 20 associated with them to check whether memory access issued by the requesting devices 316, 318 to a particular physical address space are allowed, given the PAS assignments defined in the GPT 56. Although not explicitly indicated in FIG. 13, any of the PAS filters 20 associated with these devices may also be provided with the GPT load circuitry 21 and integrity checking circuitry 23 described above. If any of these devices issue physically-addressed memory access requests (which may happen if the MMU is disabled for that environment), the selected PAS for these devices may be considered by default to be the PAS associated with the current domain (i.e. Non-Secure PAS if the current domain is Non-Secure, Secure PAS if the current domain is Secure, Realm PAS if the current domain is Realm, or Root PAS if the current domain is Root).

The interconnect 8 is shown in more detail in FIG. 13 as a coherent interconnect 8, which as well as the routing fabric 320 also includes a snoop filter 322 for managing coherency between caches 24 in the respective processing elements, and one or more system caches 324 which may perform caching of shared data shared between requesting devices. The snoop filter 322 and system caches 324 may be located upstream of the PoPA 60 and so may tag their entries using the PAS identifier selected by the MMU 16, 310 for particular masters. Requesting devices 316, 318 not associated with an MMU could be assumed by default to always issue requesting a particular domain, such as the non-secure domain (or the root domain if they can be trusted).

FIG. 13 shows, as another example of a pre-PoPA component which treats aliasing physical addresses in the respective PASs as if they were referring to different address locations, a memory protection engine (MPE) 330 provided between the interconnect 8 and a given memory controller 6 for controlling access to off-chip memory 340. The MPE 330 may be responsible for encrypting data written to off-chip memory 340 to maintain confidentiality, and decrypting the data when read back (this may include GPT blocks containing GPEs as described above). Also the MPE could protect against tampering of data stored in off-chip memory by generating integrity metadata when writing data to memory, and using the metadata when the data is read back from off-chip memory to verify whether the data has changed. When encrypting data or generating hashes for memory integrity, different keys could be used depending on which physical address space is being accessed, even if accessing aliasing physical addresses which actually correspond to the same location in the off-chip memory 340. This improves security by further isolating the data associated with different domains of operation.

In this example, the PoPA 60 is between the memory protection engine 330 and the memory controller 6, so that by the time requests reach the memory controller 6 the physical addresses are no longer treated as mapping to different physical locations in memory 340 depending on the physical address space from which they were accessed.

FIG. 13 shows another example of a completer device 6, which may be a peripheral bus or non-coherent interconnect used to communicate with peripherals 350 or regions of on-chip memory 360 (e.g. implemented as static random access memory (SRAM)). Also, the peripheral bus or non-coherent interconnect 6 could be used to communicate with secure elements 370 such as cryptographic units for performing cryptographic processing, a random number generator 372 or certain fuses 374 which store statically hard wired information. Also various power/reset/debug controllers 380 may be accessible through the peripheral bus or the non-coherent interconnect 6.

For the on-chip SRAM 360, it may be useful to provide a slave-side (completer-side) PAS filter 400 which can perform completer-side filtering of memory accesses based on completer-side protection information which defines which physical address spaces are allowed to access a given block of physical addresses. This completer-side information may be more coarsely defined than the GPT used by the requester-side PAS filters 20. For example, the slave-side information could simply indicate that an entire SRAM unit 361 could be dedicated for use by the realm domain, another SRAM unit 362 could be dedicated for use by the root domain, and so on for the other domains. Hence, relatively coarsely defined blocks of physical addresses could be directed to the different SRAM units. This completer-side protection information could be statically defined by the boot-loader code loading in information to the completer-side PAS filter at boot time that cannot be changed at run time, so it is not as flexible as the GPTs used by the requester-side PAS filters 20. However, for use cases where the division of physical addresses into particular regions accessible to each domain is known at boot time and will not change, and do not require a fine-grained partitioning, it can be more efficient to use the slave-side PAS filter 400 instead of the PAS filter 20 on the requester side, as this may allow the power and performance cost of obtaining the GPT entry and comparing the assigned PAS and sharing attribute information with information for the current memory access request to be eliminated on the requester side. Also, if a pass-through indicator can be indicated in a top-level GPT entry (or other table descriptor entry at a level other than the final level) in a multi-level GPT structure then accesses to further levels of the GPT structure (which may be performed to find more fine-grained information on the assigned PAS for requests to be subject to the requester-side checking) can be avoided for requests which target one of the regions of physical addresses which are mapped to the on-chip memory 360 which is policed by the completer-side PAS filter 400.

Hence, supporting a hybrid approach enabling both requester-side and completer-side checking of protection information can be useful for performance and power efficiency. The system designer may define which approach should be taken for particular regions of memory.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier.

The simulation code includes address translation program logic 414 and filtering program logic 416 which emulate the functionality of the address translation circuitry 16 and PAS filter 20 respectively, with reference to the same page table structures and GPT 56 as described earlier. Hence, the address translation program logic 414 translates virtual addresses specified by the target code 400 into simulated physical addresses in one of the PASs (which from the point of view of the target code refer to physical locations in memory), but actually these simulated physical addresses are mapped onto the (virtual) address space of the host processor by address space mapping program logic 415. The filtering program logic 416 performs a lookup of granule protection information to determine whether to allow memory accesses triggered by the target code to proceed, in the same way as the PAS filter described above.

GPT load program logic 418 controls loading of GPT blocks 150 from memory when required, similar to the GPT loading circuitry 21 shown in FIG. 1. However, for the simulator, the granule protection information cache 22 may not be simulated, so the simulator embodiment would behave similar to a hardware device that does not have any GPI cache 22. Hence, each memory access request would be treated as if it misses in the cache, so in FIG. 11 step 172 would be omitted so that the method passes straight from step 170 to step 174, and in the case when the data integrity check at step 178 is passed, the method would proceed straight from step 178 to step 184). Integrity checking program logic 419 emulates the integrity checking circuitry 23, to perform the data integrity check on blocks of granule protection data loaded by the GPT load program logic 418.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   address translation circuitry configured to translate a target virtual address specified by a memory access request into a target physical address associated with a selected physical address space selected from among a plurality of physical address spaces;
   granule protection entry loading circuitry configured to load from memory a granule protection data block comprising at least one granule protection entry, each granule protection entry corresponding to a respective granule of physical addresses and specifying granule protection information indicative of which of the plurality of physical address spaces is an allowed physical address space from which the granule of physical addresses is allowed to be accessed;
   filtering circuitry configured to determine whether the memory access request should be allowed to access the target physical address, based on whether the selected physical address space is indicated as an allowed physical address space by the granule protection information in a target granule protection entry corresponding to a target granule of physical addresses including the target physical address; and
   integrity checking circuitry configured to perform a data integrity check on the granule protection data block loaded from memory, and to signal a fault when the data integrity check fails, in which
   at least one of the address translation circuitry or the filtering circuitry is configured to select the selected physical address space based at least on a current domain of operation of requester circuitry from which the memory access request was issued, the current domain comprising one of a plurality of domains of operation.

2. The apparatus according to claim 1, in which the granule protection data block comprises a plurality of granule protection entries corresponding to different granules of physical addresses; and
   the integrity checking circuitry is configured to perform the data integrity check on the plurality of granule protection entries in the granule protection data block.

3. The apparatus according to claim 2, in which, in response to the memory access request:
   when the target granule protection entry is not already accessible to the filtering circuitry, the granule protection entry loading circuitry is configured to load the granule protection data block comprising the target granule protection entry from memory; and
   when the data integrity check fails for one of the plurality of granule protection entries of the granule protection data block other than the target granule protection entry, the integrity checking circuitry is configured to signal the fault even if the data integrity check passes for the target granule protection entry.

4. The apparatus according to claim 1, comprising memory encryption circuitry to encrypt data stored to a protected region of memory, and decrypt data read from the protected region of memory.

5. The apparatus according to claim 4, in which when the granule protection entry loading circuitry loads a granule protection data block from the protected region of memory, the memory encryption circuitry is configured to decrypt the granule protection data block read from the protected region of memory prior to providing the granule protection data block to the filtering circuitry or the integrity checking circuitry.

6. The apparatus according to claim 1, in which the granule protection information is encoded using N bits of the granule protection entry, a first subset of encodings of the N bits are valid encodings indicating valid options for the granule protection information, and a second subset of the encodings of the N bits are invalid encodings; and
   the data integrity check comprises checking, for each granule protection entry in the granule protection data block, whether the granule protection information of that granule protection entry has one of the first subset of encodings or the second subset of encodings.

7. The apparatus according to claim 6, in which the integrity checking circuitry is configured to signal the fault when any granule protection entry in the granule protection data block has one of the second subset of encodings.

8. The apparatus according to claim 1, in which the data integrity check comprises determining whether at least one integrity signature value associated with the granule protection data block matches at least one signature checking value derived from the granule protection data block.

9. The apparatus according to claim 1, in which the filtering circuitry comprises requester-side filtering circuitry to determine, based on the granule protection information in the target granule protection entry, whether to allow the memory access request to be passed to a cache or passed to an interconnect for communicating with a completer device for servicing the memory access request.

10. The apparatus according to claim 9, in which the integrity checking circuitry comprises requester-side integrity checking circuitry to perform the data integrity check on the granule protection data block loaded from memory after the granule protection data block has been received from the interconnect.

11. The apparatus according to claim 1, in which the address translation circuitry is configured to translate the target virtual address to the target physical address based on at least one page table entry; and
    at least when the current domain is one of a subset of the plurality of domains, said at least one of the address translation circuitry and the filtering circuitry is configured to select the selected physical address space based on the current domain and physical address space selection information specified in said at least one page table entry.

12. The apparatus according to claim 1, in which the plurality of domains include a root domain for managing switching between other domains; and
    when the data integrity check fails, the integrity checking circuitry is configured to signal the fault to be handled by program code executed in the root domain.

13. The apparatus according to claim 1, in which:
    in response to the memory access request, when no valid granule protection entry has been defined for the target granule of physical addresses, or when the filtering circuitry determines based on the target granule protection entry that the memory access request is not allowed to access the target physical address, the filtering circuitry is configured to signal a fault associated with a different fault type or different fault syndrome information to the fault signaled by the integrity checking circuitry when the data integrity check fails.

14. An apparatus, comprising:

address translation circuitry configured to translate a target virtual address specified by a memory access request into a target physical address associated with a selected physical address space selected from among a plurality of physical address spaces;

granule protection entry loading circuitry configured to load from memory a granule protection data block comprising at least one granule protection entry, each granule protection entry corresponding to a respective granule of physical addresses and specifying granule protection information indicative of which of the plurality of physical address spaces is an allowed physical address space from which the granule of physical addresses is allowed to be accessed;

filtering circuitry configured to determine whether the memory access request should be allowed to access the target physical address, based on whether the selected physical address space is indicated as an allowed physical address space by the granule protection information in a target granule protection entry corresponding to a target granule of physical addresses including the target physical address;

integrity checking circuitry configured to perform a data integrity check on the granule protection data block loaded from memory, and to signal a fault when the data integrity check fails;

a point of physical aliasing (PoPA) memory system component configured to de-alias a plurality of aliasing physical addresses from different physical address spaces which correspond to the same memory system resource, to map any of the plurality of aliasing physical addresses to a de-aliased physical address to be provided to at least one downstream memory system component; and at least one pre-PoPA memory system component provided upstream of the PoPA memory system component, where the at least one pre-PoPA memory system component is configured to treat the aliasing physical addresses from different physical address spaces as if the aliasing physical addresses correspond to different memory system resources.

15. The apparatus according to claim 14, in which the aliasing physical addresses are represented using the same physical address value in the different physical address spaces.

16. A non-transitory storage medium storing a computer program comprising instructions which, when executed on a host data processing apparatus, control the host data processing apparatus to provide an instruction execution environment for execution of target code; the computer program comprising:

address translation program logic to translate a target virtual address specified by a memory access request into a target simulated physical address associated with a selected simulated physical address space selected from among a plurality of simulated physical address spaces; and granule protection entry loading program logic to load from memory a granule protection data block comprising at least one granule protection entry, each granule protection entry corresponding to a respective granule of simulated physical addresses and specifying granule protection information indicative of which of the plurality of simulated physical address spaces is an allowed simulated physical address space from which the granule of simulated physical addresses is allowed to be accessed;

filtering program logic to determine whether the memory access request should be allowed to access the target simulated physical address, based on whether the selected simulated physical address space is indicated as an allowed simulated physical address space by the granule protection information in a target granule protection entry corresponding to a target granule of simulated physical addresses including the target simulated physical address; and integrity checking program logic to perform a data integrity check on the granule protection data block loaded from memory, and to signal a fault when the data integrity check fails, in which at least one of the address translation program logic or the filtering program logic is configured to select the selected simulated physical address space based at least on a current domain of operation of requester program logic from which the memory access request was issued, the current domain comprising one of a plurality of domains of operation.

* * * * *